United States Patent [19]

Suzuki et al.

[11] Patent Number: 4,673,272

[45] Date of Patent: Jun. 16, 1987

[54] FILM TRANSPORT APPARATUS FOR CAMERA

[75] Inventors: Masayuki Suzuki, Kanagawa; Tsunemasa Ohara; Yoichi Tosaka, both of Tokyo; Ryuichi Kobayashi, Kanagawa; Yoshihito Harada, Kanagawa; Masaharu Kawamura, Kanagawa, all of Japan

[73] Assignee: Canon Kabushiki Kaisha

[21] Appl. No.: 865,063

[22] Filed: May 19, 1986

[30] Foreign Application Priority Data

May 24, 1985 [JP] Japan ................................. 60-111667
Jan. 25, 1986 [JP] Japan ................................. 61-13014

[51] Int. Cl.<sup>4</sup> ........................... G03B 1/18; G03B 1/58
[52] U.S. Cl. ............................... 354/173.11; 354/214
[58] Field of Search ................ 354/173.1, 173.11, 214

[56] References Cited

U.S. PATENT DOCUMENTS 4,397,535  8/1983  Harvey ........................ 354/173.1 X
4,416,525  11/1983  Chan ............................ 354/173.1
4,572,635  2/1986  Tsuzuki et al. ................ 354/173.1
4,616,913  10/1986  Suzuki et al. .................. 354/173.1

Primary Examiner—W. B. Perkey
Attorney, Agent, or Firm—Toren, McGeady & Associates

[57] ABSTRACT

A film transport apparatus having a spool for taking up film as it rotates, a sprocket for pulling the film in engagement with the perforations thereof toward the spool, and a windup drive system for driving the spool or the sprocket. The film transport apparatus is provided with control means for causing the windup drive system to drive both of the spool and the sprocket from the start of an auto-loading until before its termination, and then to drive only the spool at the terminal stage of the auto-loading, and detecting means for detecting that the film is not sent in the terminal stage of the auto-loading.

20 Claims, 18 Drawing Figures

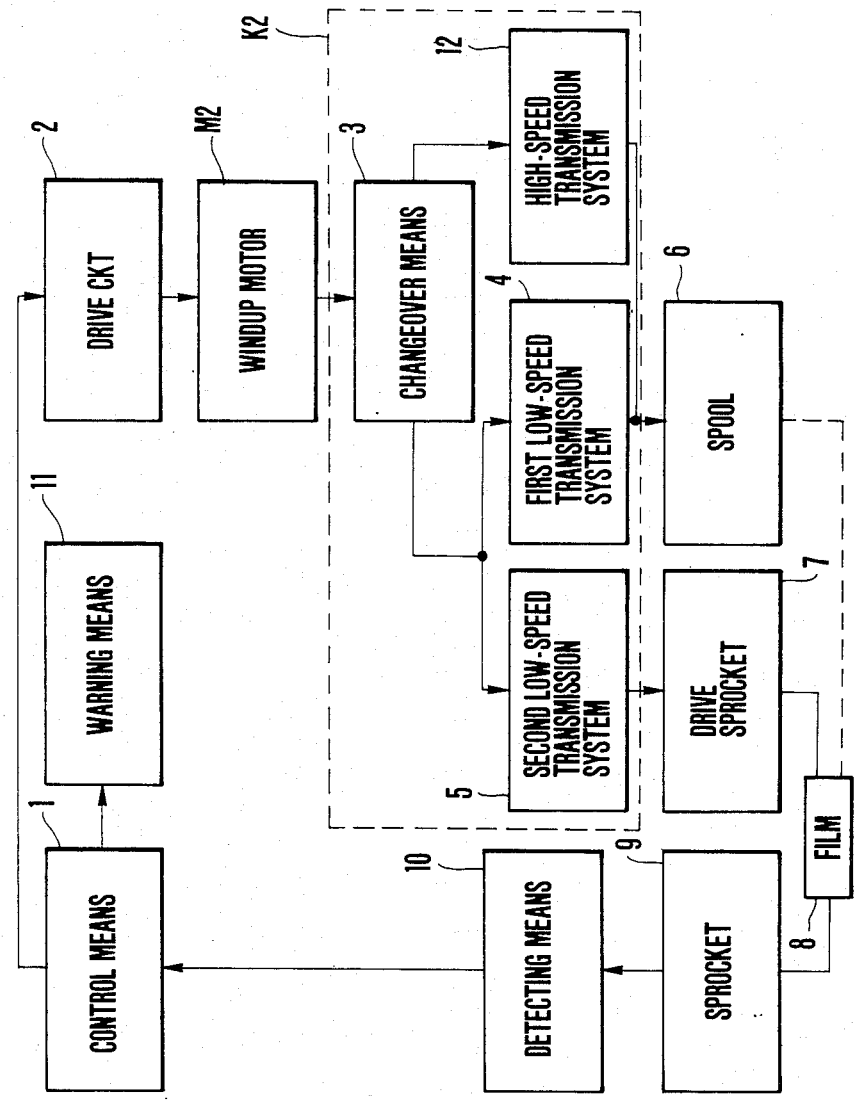
F I G.1

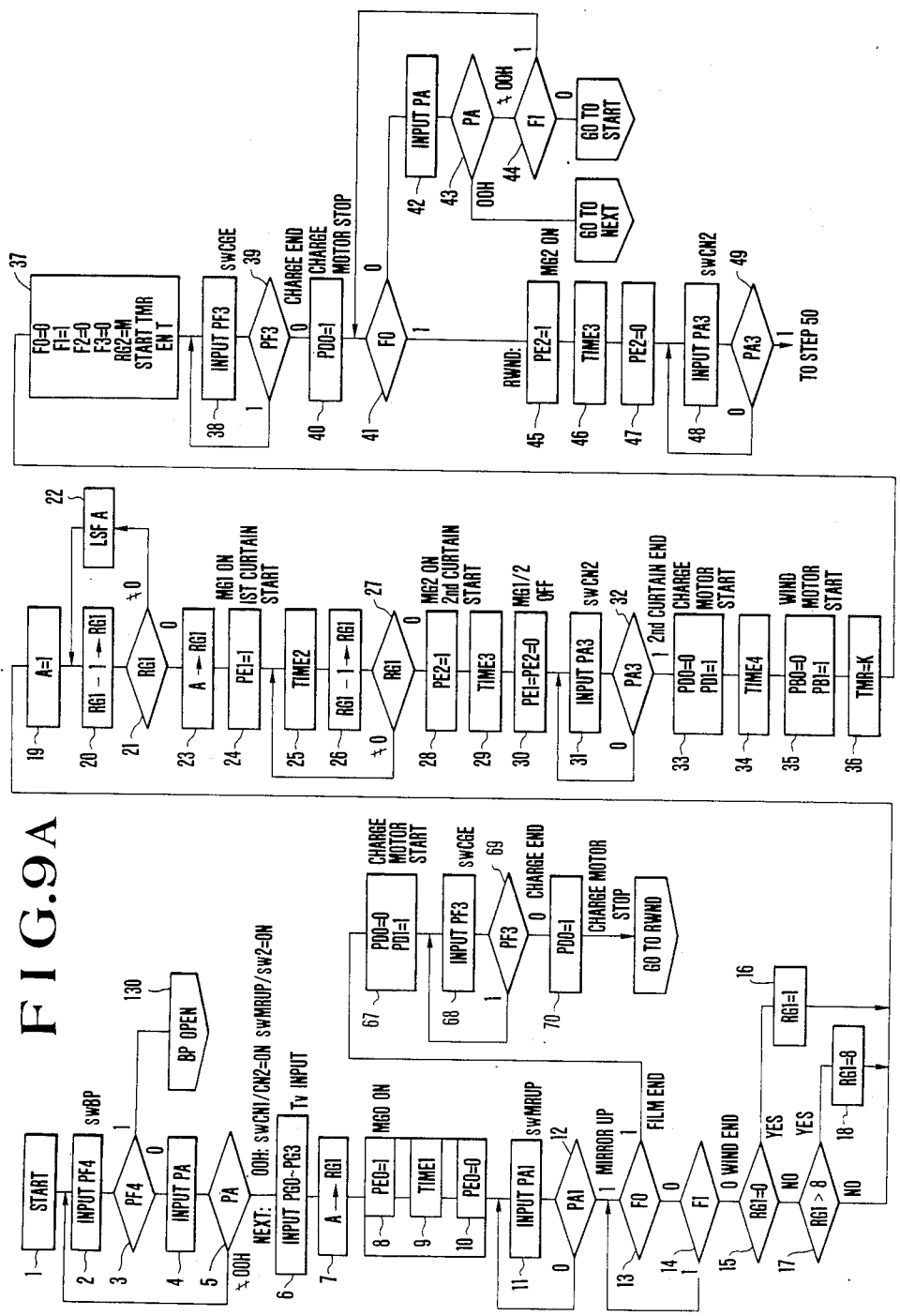

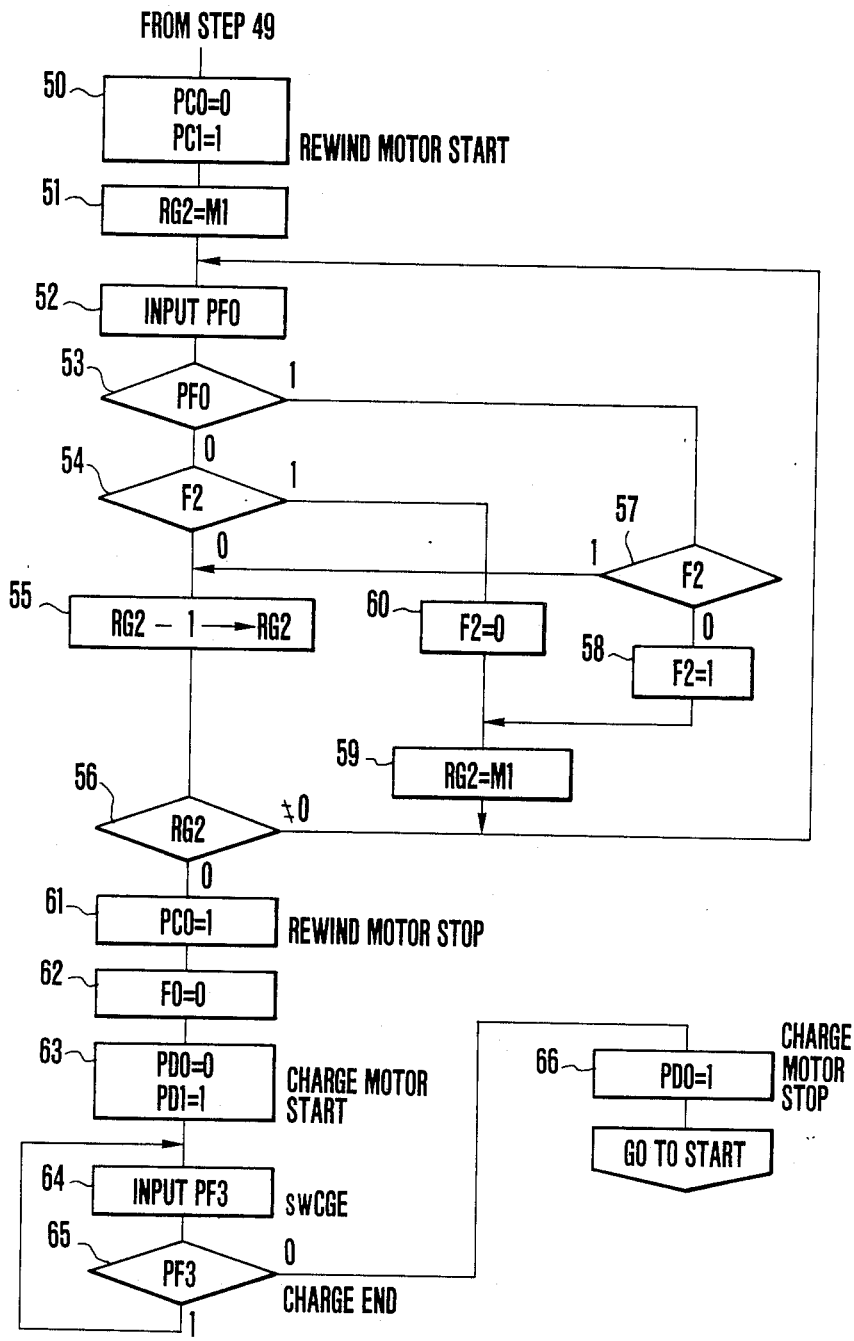

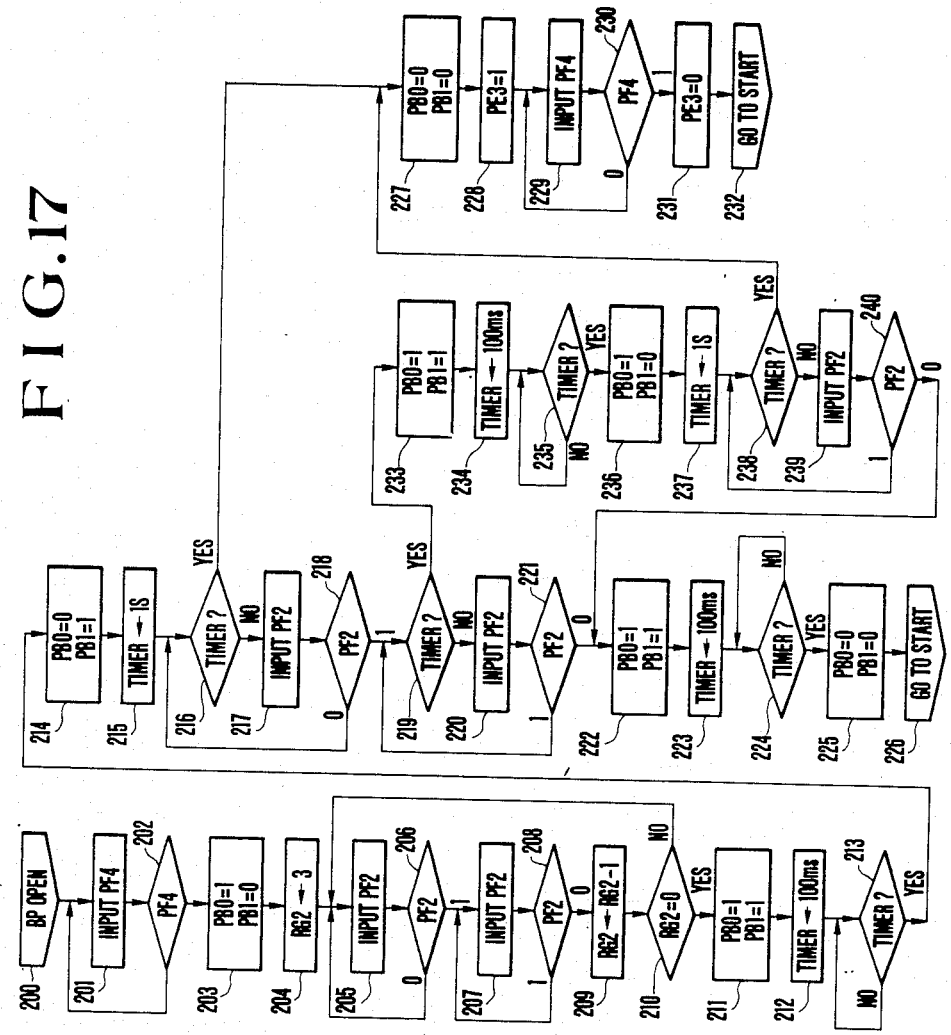

4,673,272

FILM TRANSPORT APPARATUS FOR CAMERA

BACKGROUND OF THE INVENTION

1. Field of the Invention

This invention relates to film transport apparatus having a film auto-loading capability.

2. Description of the Related Art

The cameras capable of automatically loading film have been necessarily provided with the film transport apparatus of the type in which the sprocket is driven at the time of the film auto-loading, for the leader of the film is forcibly pulled out. Since the sprocket is forcibly driven by the windup drive system, even when the film is not tightly convoluted on the spool, therefore, the film is caused to be sent. If, in this state, the film is sent, the film rubs the wall of the spool chamber, getting scratches. Moreover, finally the film can no longer be sent into the spool chamber (called "jamming"), leading to a damage of the film. In the past, it was impossible to detect that the film was not tightly convoluted on the spool until a number of frames had been exposed.

SUMMARY OF THE INVENTION

An object of the invention is to provide a film transport apparatus for camera capable of immediately detecting the state of the film not tightly convoluted on the spool when auto-loading.

Other objects of the invention will become apparent from the following detailed description.

BRIEF DESCRIPTION OF THE DRAWINGS

FIG. 1 is a block diagram illustrating a first embodiment of the invention.

FIGS. 9A, 9B, 10 and 11 are a flow chart.

FIG. 17 is a flow chart of an auto-loading treatment illustrating a fourth embodiment of the invention.

DETAILED DESCRIPTION OF THE PREFERRED EMBODIMENTS

Figure 2:
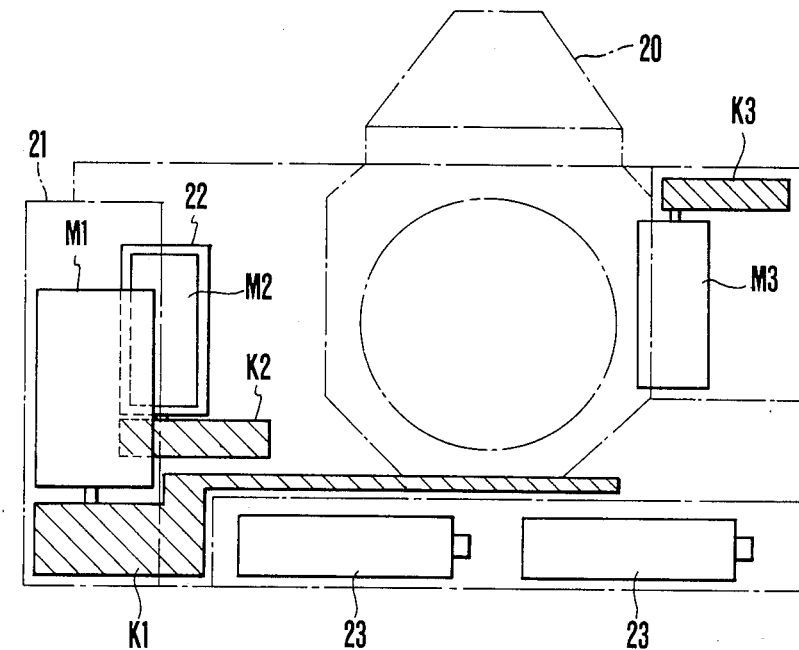
FIG. 2 is a front elevational view of a camera in which the embodiment shown in FIG. 1 takes form.

FIG. 1 illustrates the fundamental construction of an embodiment of the invention.

In case when a film auto-loading is carried out, a film cartridge is set and a back cover is closed. Responsive to this, control means 1 operates a drive circuit 2 so that a windup motor M2 rotates in one direction (for example, counterclockwise direction). Thereby, changeover means 3 selects first and second slow-speed transmission systems 4 and 5 of large speed reduction ratios. Thus, the rotation of the windup motor M2 is transmitted through the first low-speed transmission system 4 to a spool 6 and through the second low-speed transmission system 5 to a drive sprocket 7. As the film 8 has the perforations of its leader in engagement with the drive sprocket 7 and a sprocket 9 which is driven through the film 8, the film 8 is sent to the spool 6 by the rotation of the drive sprocket 7, and is taken up on the rotating spool 6. Detecting means 10 detects rotation of the sprocket 9 for one frame of film and its output is applied to the control means 1. The control means 1 operates in response to the signal from the detecting means 10 so that the first three of four blank frames at the time of film auto-loading are wound up in sequence at such a relatively slow speed. For note, the speed of rotation of the spool 6 is set to be faster than that of the drive sprocket 7. So, after the leader of the film 8 has once convoluted round the spool 6, the film 8 is then pulled out of the cartridge by the spool 6 so that the drive sprocket 7 and the sprocket 9 are driven by the spool 6 through the film 8.

If the camera is not loaded with the film 8, or if, as the leader of the film 8 is not sufficiently pulled out, its perforations do not engage the drive sprocket 7 and the sprocket 9, the film 8 is not sent and, therefore, the sprocket 9 also is not rotated. This is detected by the detecting means 10, and, in response to this, the control means 1 causes warning means 11 to warn an auto-loading miss by light or sound.

When the winding up of the three frames has normally been completed, the control means 1 operates the drive circuit 2 in such a manner that the windup motor M2 is supplied with current in the reversed direction, rotating in the other direction (for example the clockwise direction). Thereby, the changeover means 3 selects a high-speed transmission system 12 of small speed reduction ratio and the rotating force of the windup motor M2 is transmitted through the high-speed transmission system 12 to only the spool 6. Since, at this time, the second low-speed transmission system 5 is cut off from the windup motor M2, the drive sprocket 7 is not driven to rotate. If the film 8 is tightly convoluted on the spool 6, the film 8 is wound up one frame at a relatively high speed by this spool driving.

In a state of the film 8 not tightly convoluted on the spool 6, when driving the spool 6, the film 8 is not sent, and the sprocket 9 does not rotate. So the detecting means 10 detects this, and the control means 1 then causes the warning means 11 to warn an auto-loading miss by light or sound.

When in the usual film winding up, the control means 1 operates the drive circuit 2 in such a manner that the windup motor M2 rotates in the other direction (clockwise direction). Thereby, the changeover means 3 holds the selection of the high speed transmission system 12 of small speed reduction ratio. The rotating force of the windup motor M2 is transmitted through the high-speed transmission system 12 only to the spool 6, and the film 8 is wound up at a relatively high speed.

The changeover means 3, the first low-speed transmission system 4, the second low-speed transmission system 5 and the high-speed transmission system 12 constitute a windup transmission system K2. But, the low-speed transmission systems 4, 5 and the high-speed transmission system 12 may have their speed reduction gear trains partly or wholly in common. In this case, form becomes such that the changeover means 3 is inserted midway in the transmission systems 4, 5, 12. The windup motor M2 and the windup transmission system K2 constitute a windup drive system.

The detecting means 10 detects even windup states such as the progress of winding up, just before the completion of winding up, and when the winding up has completed. Responsive to these detection signals, the control means 1 controls the deceleration and stop of the windup motor M2.

According to this embodiment, the blank-feeding of the last one frame when in the auto-loading is made to perform by the spool drive, and it is at that time to make detection of whether or not the film 8 is being sent. Therefore, the state that the film 8 is not tightly convoluted on the spool 6 can be detected in the auto-loading stage. Therefore, the failure of taking photographs due to the scratches of the film, damages of the film, and the hindrance of using up all the prescribed number of film frames due to the loose convolution of the film can be prevented. Another feature of the invention is that the detection of the sending of the film 8 is made by detecting the rotation of the sprocket 9 which is not directly connected to the drive sprocket 7. Therefore, the detection of the fact that the sprocket 9 does not rotate when the first three frames are sent in vain can be taken as an auto-loading miss.

The sprocket 9 may be mechanically direct-connected to the drive sprocket 7. In this case, however, because the sprocket 9 also rotates always when the first three frames are fed in vain, an auto-loading miss of this time cannot be detected.

The spool 6 and the drive sprocket 7 may be driven by respective individual motors. Also, the detection of the sending of the film 8 may be done not depending on the rotation of the sprocket 9 but by optically, mechanically or electrically detecting the motion of the film 8 directly.

An example of a film transport apparatus embodying the first embodiment of FIG. 1 in a camera is shown in FIGS. 2 to 8.

FIG. 2 is a view illustrating an arrangement of all motors as looked from the front of the camera. A charge motor M1 for governing the shutter charge, and the charge of diaphragm adjusting mechanism, lens drive mechanism and mirror up and-down mechanism is arranged in the front left hand side corner of a camera 20. For the charge motor M1, its load varies little as the environmental conditions, but because of its having a large absolute load, its size is necessarily relatively large. For this reason, the charge motor M1 is accommodated in a grip 21 formed as projecting from the front left hand side corner of the camera 20. K1 is a charge transmission system for the charge motor M1. A windup motor M2 is arranged in a spool structure 22 for taking up the film, and a windup transmission system K2 is arranged adjacent thereto. A rewind motor M3 is arranged in the front right hand side corner of the camera 20, or on the cartridge side, and a rewind transmission system K3 is arranged adjacent thereto. An electrical power source 23 comprises four AA type batteries.

Figure 3:
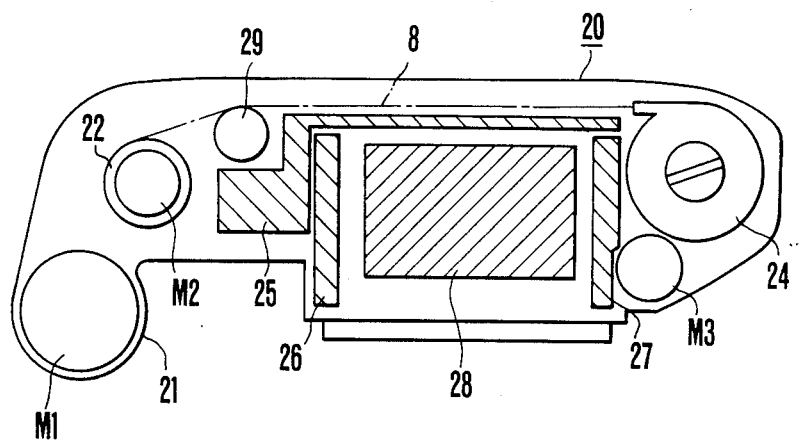
FIG. 3 is a top plan view of the camera of FIG. 2.

FIG. 3 is a view illustrating the same arrangement of the motors M1 to M3 but as looked from the top of the camera 20, along with a film cartridge 24, a vertically running shutter of the blade type 25, a mirror mechanism 26, an adjusting mechanism 27 for a diaphragm of the lens, a lens drive mechanism 28 and a sprocket structure 29 for indexing the sent amount of the film 8.

Figure 4:
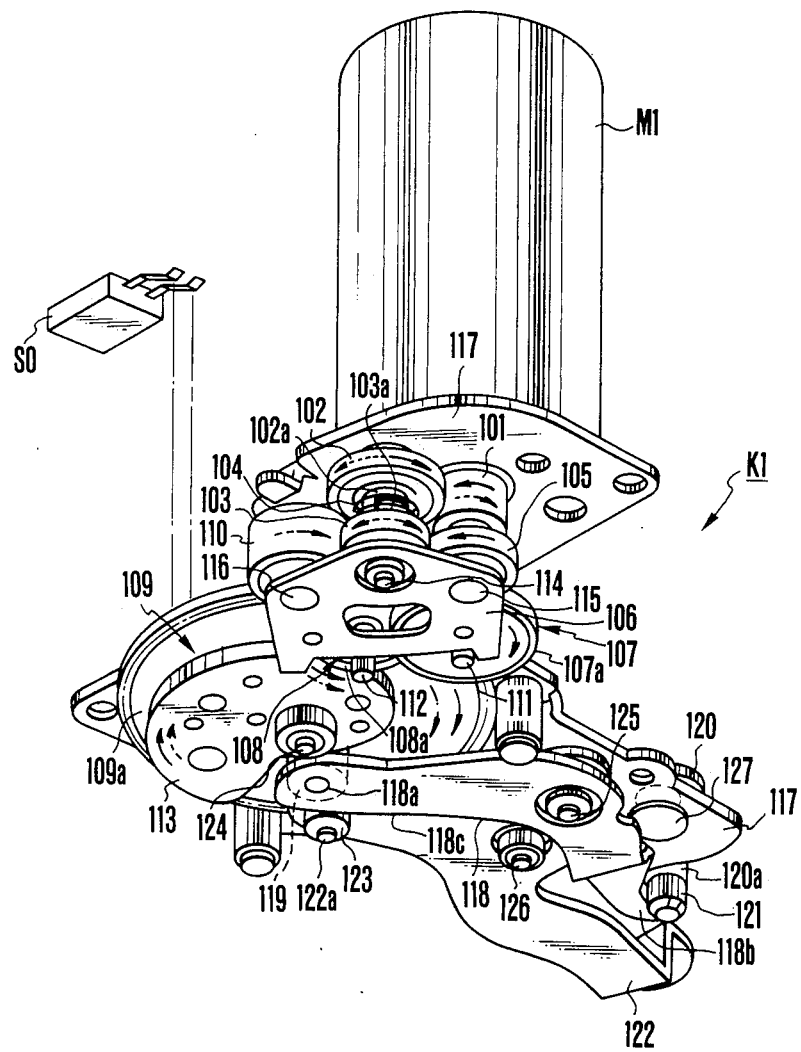
FIG. 4 is a perspective view of a charge transmission system.

In FIG. 4, the details of the charge motor M1 and the charge transmission system K1 are shown.

A pinion gear 101 is fixed to an output shaft of the charge motor M1, and meshes with a gear 102. The gear 102 and a gear 103 constitute a 2-stage gear and are rotatably mounted on a shaft 114 planted on a base plate 117 independently of each other. In the gears 102 and 103 there are formed respective extensions 102a and 103a projecting in the thrust direction in alternating relation so that when these extensions 102a and 103a are in engagement, the gears 102 and 103 operatively connect each other in the direction of rotation, but are freely movable relative to each other in the thrust direction. Meanwhile, the gear 103 has a surface in contact with a planetary lever 106 pivotable about the shaft 114. A compressed spring 104 between the gears 102 and 103 brings the gear 103 into frictional contact with the planetary gear 106. Thereby, the planetary lever 106 is turned as following up the direction of rotation of the gear 103. A gear 105 is rotatably mounted on a shaft 115 planted on the planetary lever 106 and always meshes with the gear 103. A 2-stage gear 107 having a large gear 107a and a small gear (not shown) formed in fixed relation on the upper surface thereof is rotatably mounted on a shaft 111 planted on the base plate 117, and is arranged so that when the gear 103 rotates in a clockwise direction and the gear 105 rotates in a counterclockwise direction (indicated by arrow), the planetary lever 106 rotates in a clockwise direction to bring the large gear 107a into engagement with the gear 105. A gear 108 is rotatably mounted on a shaft 112 planted on the base plate 117 and is comprised of a large gear 108a and a small gear (not shown) formed in fixed relation on the upper surface thereof. The large gear 108a always meshes with the small gear of the gear 107. A gear 110 is rotatably mounted on a shaft 116 planted on the planetary lever 106 and always meshes with the gear 103. When the gear 103 turns in the counterclockwise direction, the planetary lever 106 is turned until the gear 110 meshes with the large gear 108a. A cam gear 109 is rotatably mounted on a shaft 124 planted on the base plate 117, and has a gear 109a and a cam 113. The gear 109a always meshes with the small gear of the gear 108. The transmission system from the pinion gear 101 to the cam gear 109 is changed over between large and small speed reduction ratios depending upon the direction of rotation of the charge motor M1. In more detail, when the charge motor M1 rotates in the counterclockwise direction, all the parts rotate in their directions indicated by solid line arrows, causing the planetary lever 106 to turn in the clockwise direction so that a low-speed gear train of the large speed reduction ratio is established: The pinion gear 101→the gears 102, 103,→the gear 105→ the gear 107 (large gear 107a, small gear)→the gear 108 (large gear 108a, small gear)→the cam gear 109. Conversely when the charge motor M1 rotates in the clockwise direction, all the parts rotate in their reversed directions indicated by dashed line arrows, causing counterclockwise movement of the planetary lever 106 by which the transmission system is changed over to a high-speed gear train of small speed reduction ratio comprising: the pinion gear 101→the gears 102, 103→the gear 110→the gear 108 (large gear 108a, small gear)→the cam gear 109. For note, the above-described two gear trains are so constructed that the cam gear 109 rotates always in the clockwise direction no matter which direction the rotation of the charge motor M1 may take.

A first shutter charge lever 118 is pivotally mounted about a shaft 125 planted on the base plate 117 and has one end on which is mounted a shaft 118a with a roller 119 thereon, and the other end which is formed to a cam 118b. The roller 119 slidably rides on the outer periphery or camming surface of the cam 113 of the cam gear 109 so that the swinging movement that follows up the cam displacement of said camming surface is given to the first shutter charge lever 118. And, by this swinging, the cam 118b also is caused to swing. A second shutter charge lever 120 is pivotally mounted about a shaft 127 planted on the base plate 117, and has a roller 121 rotatably mounted on a shaft 120a. The roller 121 is in engagement with the cam 118b so that the swinging movement of the first shutter charge lever 118 can cause swinging movement of the second shutter charge lever 120. And, the second shutter charge lever 120 charges a known shutter mechanism (not shown).

A lever 122 for charging a known diaphragm adjusting mechanism, a mirror mechanism, a lens drive mechanism, and others is pivotally mounted about a shaft 126 planted on the base plate 117, and has one end on which is mounted a shaft 122a with a roller 123 thereon. This roller 123 is in engagement with a cam 118c of the first shutter charge lever 118. Therefore, the lever 122 also swings as following up the swinging of the first shutter charge lever 118, while charging the diaphragm adjusting mechanism, the mirror mechanism and others.

A contact member S0 constitutes a switch together with a signal substrate (not shown) fixedly mounted to the cam gear 109 to detect that the cam 113 has rotated by the charge motor M1.

Figure 5:
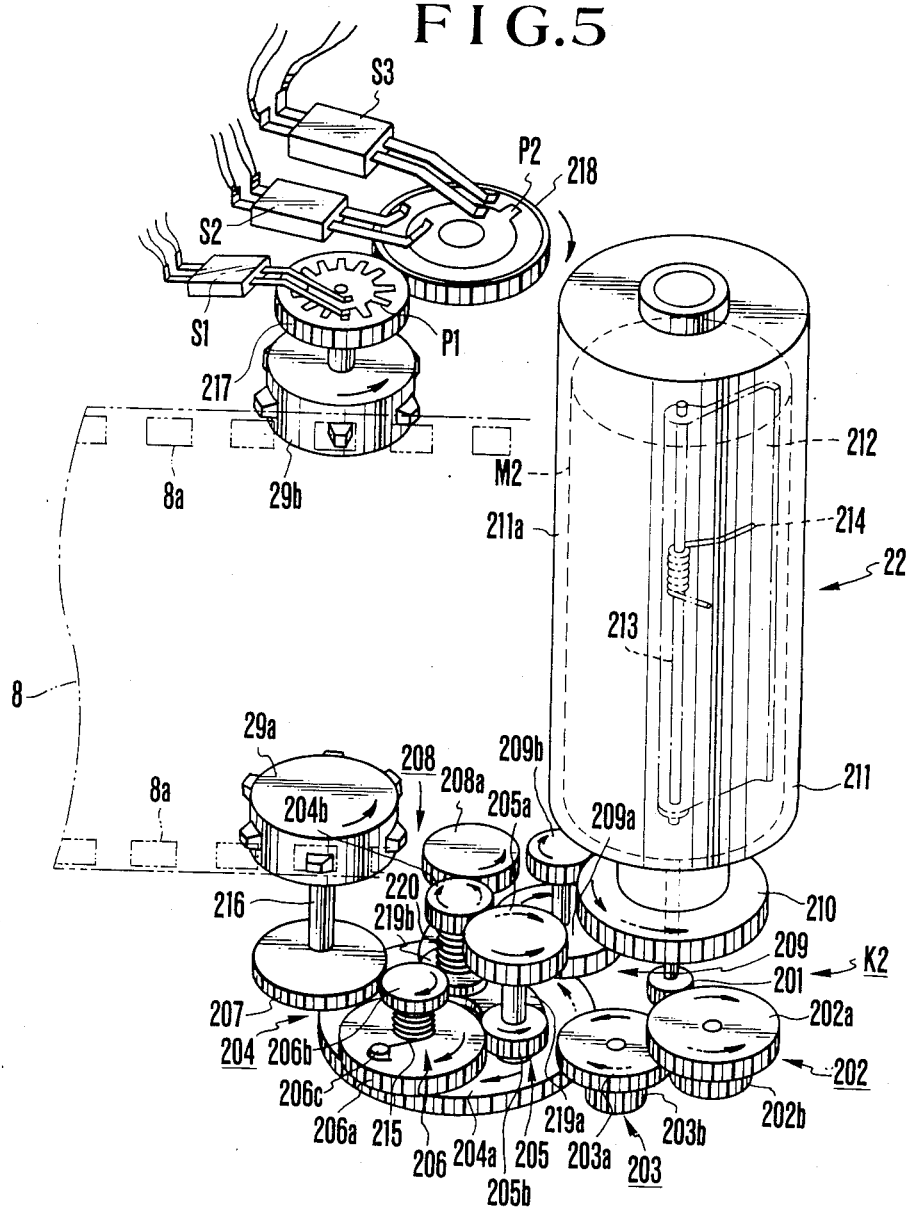
FIG. 5 is a perspective view of a windup transmission system.

FIG. 5 illustrates the details of the windup transmission system K2 of the windup motor M2.

A pinion gear 201 is fixedly mounted to an output shaft of the windup motor M2 arranged within the spool structure 22. A 2-stage gear 202 has a large gear 202a and a small gear 202b, and is rotatably mounted. The large gear 202a meshes with the pinion gear 201. A 2-stage gear 203 has a large gear 203a and a small gear 203b, and is rotatably mounted. The large gear 203a meshes with the small gear 202b. A 2-stage gear 204 has a large gear 204a and a small gear 204b, and is rotatably mounted. The large gear 204a meshes with the small gear 203b. On the central shaft of the 2-stage gear 204 is rotatably mounted a planetary lever 219a through a bearing 219b. A compressed spring 220 between the small gear 204b and the bearing 219b urges the bearing 219b in frictional contact on the large gear 204a. By this frictional contact, the planetary lever 219a is caused to rotate as following up the direction of rotation of the gear 204. Rotatably mounted on the planetary lever 219a are a 2-stage gear 205 having a large gear 205a and a small gear 205b and another 2-stage gear 208 having a large gear 208a and a small gear (not shown) formed in fixed relation to the bottom thereof. A 2-stage gear 206 is arranged near the gear 205 and its large and small gears 206a and 206b are rotatably mounted independently of each other. A coil spring 215 is arranged between the large and small gears 206a and 206b to give the one-way clutch function thereto. Because one of the ends of the coil spring 215 is fixedly secured to a boss 206c of the large gear 206a, as the large gear 206a rotates in the clockwise direction, the coil spring 215 tightens the shaft portion of the small gear 206b, causing it to rotate in unison. A gear 207 always meshes with the small gear 206b and is fixedly mounted on a common shaft 216 of a drive sprocket 29a.

A 2-stage gear 209 is arranged near the gear 208, has a large gear 209a and a small gear 209b, and is rotatably mounted. A spool gear 210 is fixedly mounted to a spool 211 of the spool structure 22, rotatably mounted, and always meshes with the small gear 209b. The surface of the spool 211 is coated with a rubber member 211a over the entire circumference to promote the automatic convolution of the film 8. A cover 212 is arranged near the outside of the spool 211 and rotatably mounted on a shaft 213 provided on a stationary portion of the camera. A spring 214 urges the cover 212 toward the spool 211 so that the cover 212 performs the function of promoting the automatic convolution of the film 8 onto the spool 211. For note, the cover 212, shaft 213 and spring 214 are illustrated only in one pair, another pair is arranged on the opposite side.

A sprocket 29b is driven by only the film 8 (concretely speaking, as the perforations 8a moves, the teeth contacting therewith are rotated). Its rotation is transmitted through a connected shaft to a gear 217. Fixedly mounted on the gear 217 is a pulse substrate whose entire circumference is divided to twelve equal parts (equally divided twelve pulse patterns are formed) P1. When the sprocket 29b rotates one revolution, twelve pulses are obtained through a contact member S1. Since the sprocket 29b has six teeth, for, in the camera of 35mm full size, its 4/3 revolutions advance the film to one frame, the number of pulses obtained through the contact member S1 is, therefore, 16. Needless to say, it is possible to choose any desired number of equally divided parts of the pulse substrate P1. In case when the reduction of the speed of the windup motor M2 is controlled by the intermittent current supply (duty drive) method, it is preferred to make that number much larger.

The gear 217 meshes with a detection gear 218. The ratio of the number of teeth of the gear 217 to the detection gear 218 is 3:4. Fixedly mounted on the gear 218 is a pulse substrate P2 such that one pulse is produced for one revolution. This pulse is obtained through contact members S2 and S3. The contact member S2 is provided ahead the contact member S3 by a prescribed phase. By the pulse produced from the contact member S2, the driving of the windup motor M2 is changed over to the duty drive to lower the number of revolutions, so that when the windup motor M2 is braked by the pulse from the contact member S3, it stops rapidly.

When the windup motor M2 is controlled by the pulse produced during the time of one revolution of the detection gear 218, it is in the camera of 35 mm full size that the distance the film is advanced is equal to the length of one frame. As a matter of course, if the tooth number ratio of the gear 217 to the detection gear 218 is changed to 3:2, or while the tooth number ratio is left unchanged from 3:4, the pulse disc P2 is divided to two equal parts so that one pulse is produced for every 180° revolution, the film feeding amount for one cycle can be made half size. Also, in this case, if the windup motor M2 is stopped when two pulses are counted, the film feeding amount can be set back to the full size. Further, if it is made possible to change over the number of counted pulse between one and two, a choice of the full size and the half size can be easily realized.

Next explanation is made about the transmission of the rotating force of the windup motor M2. When the windup motor M2 rotates in the counterclockwise direction, the various gears rotates in the directions of solid line arrows. As the gear 204 rotates in the clockwise direction, the planetary lever 219a is caused to turn in the clockwise direction, thereby the small gear 205b is brought into meshing engagement with the large gear 206a, and the small gear of the gear 208 into meshing engagement with the large gear 209a. Therefore, the rotation of the windup motor M2 is transmitted through the gear train of a large speed reduction ratio: the pinion gear 201→the gear 202 (large gear 202a, small gear 202b)→the gear 203 (large gear 203a, small gear 203b)→the gear 204 (large gear 204a, small gear 204b)→the gear 205 (large gear 205a, small gear 205b)→the gear 206 (large gear 206a, small gear 206b)→the gear 207→the drive sprocket 29a and also through the gear train of a large speed reduction ratio: the gear 204 (large gear 204a, small gear 204b)→the gear 208 (large gear 208a, small gear 208b)→the gear 209 (large gear 209a, gear 209b)→the spool gear 210 →spool 211.

Conversely when the windup motor M2 is made rotate in the clockwise direction, all the gears rotate in their directions of dashed line arrows, thereby, as the gear 204 rotates in the counterclockwise direction, the planetary lever 219a is turned in the counterclockwise direction and the large gear 205a is engaged directly with the spool gear 210. Therefore, the transmission system K2 is changed over to the high speed gear train of the small speed reduction ratio which comprises the pinion gear 201→the gear 202 (large gear 202a, small gear 202b)→the gear 203 (large gear 203a, small gear 203b)→the gear 204 (large gear 204a, small gear 204b)→the large gear 205a→the spool gear 210. For note, the gear train to the drive sprocket 29a is cut off and the drive sprocket 29a becomes freely rotatable.

As has been described above, the transmission system from the windup motor M2 to the spool 211 gets either one of the two values of the speed reduction ratio depending on the direction of rotation of the windup motor M2, specifically speaking, the large value for the counterclockwise direction, and the small value for the clockwise direction. For note, in either direction of rotation of the windup motor M2, the rotation of the spool 211 always takes the counterclockwise direction.

It should be pointed out that when the camera is being automatically loaded with film, the windup motor M2 is made rotate in the counterclockwise direction for the first three blank frames are fed. Therefore, the windup transmission system K2 is changed over to the large speed reduction ratio, and the drive sprocket 29a and the spool 211 are driven to rotate at the slow speed. For the last one frame, the windup motor M2 is made rotate in the clockwise direction, thereby the windup transmission system K2 is changed over to the small speed reduction ratio. So, only the spool 211 is driven to rotate at the fast speed. Even in advancing the film frame by frame after each exposure, only the spool 211 rotates. Of course, even if the windup motor M2 is made rotate in the counterclockwise direction when each exposed frame of film is wound up, since the peripheral speed of the spool 211 is previously determined to be larger than that of the drive sprocket 29a, because the drive sprocket 29a is allowed to be driven by the film 8 being wound up by the spool 211, there is no problem. Therefore, the drive sprocket 29a drives the film 8 only when the film 8 is not wound up the spool 211. Outside that, the drive sprocket 29a follows up the film 8 regardless of the direction of rotation of the windup motor M2.

Figure 6:
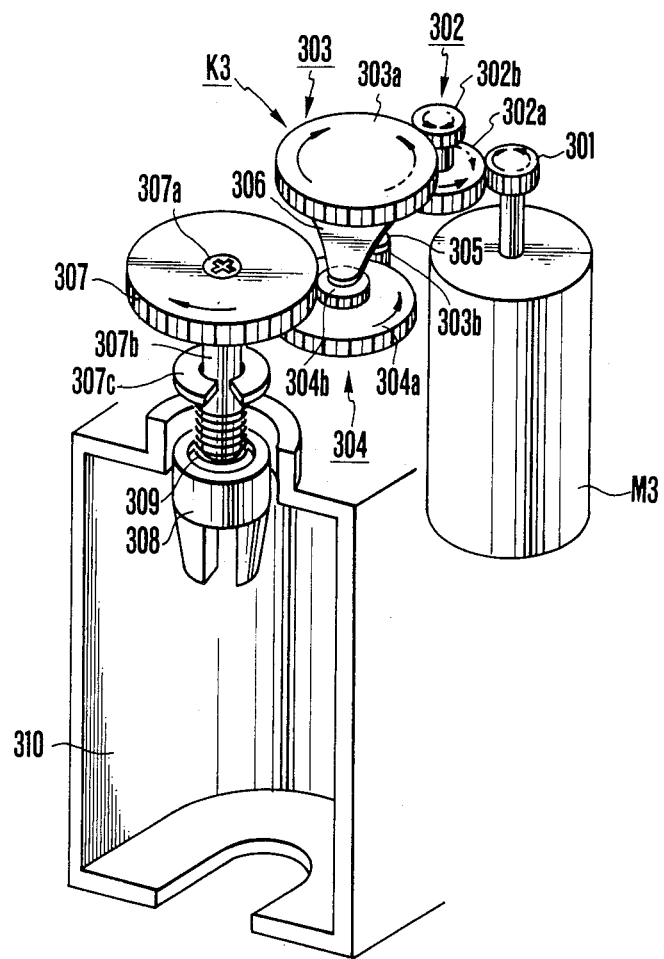
FIG. 6 is a perspective view of a rewind transmission system.

In FIG. 6, the rewind motor M3 and details of the rewind transmission system K3 are shown.

A pinion gear 301 is fixedly mounted to the output shaft of the rewind motor M3. A 2-stage gear 302 has a large gear 302a and a small gear 302b and is rotatably mounted. The large gear 302a meshes with the pinion gear 301. A 2-stage gear 303 has a large gear 303a and a small gear 303b, and is rotatably mounted. The large gear 303a meshes with the small gear 302b. A planetary lever 306 is rotatably mounted on the same shaft of the gear 303, and a compressed spring 305 is arranged between the small gear 303b and the planetary lever 306 to put the planetary lever 306 and the large gear 303a in frictional contact. By this frictional contact, the planetary lever 306 is caused to turn as following up the direction of rotation of the gear 303. Rotatably mounted on the free end of the planetary lever 306 is a 2-stage gear 304 having a large gear 304a and a small gear 304b. A gear 307 is fixedly mounted to one end of a shaft 307b by a screw fastener 307a, the other end of which carries a fork 308. The fork 308 is arranged to project into a cartridge chamber 310, and to engage with a supply spool in a film cartridge (not shown). A coil spring 309 between the fork 308 and a collar 307c on the shaft 307b, so that the fork 308 can temporarily retract to facilitate quick and easy insertion of the film cartridge into the cartridge chamber.

When the rewind motor M3 rotates in the clockwise direction, the gear 303 rotates in the clockwise direction, causing the planetary lever 306 to turn in the clockwise direction until the small gear 304b comes to mesh with the gear 307. Therefore, the rotating force is transmitted as the pinion gear 301→the gear 302 (large gear 302a, small gear 302b)→the gear 303 (large gear 303a, small gear 303b)→the gear 304 (large gear 304a, small gear 304b)→the gear 307→the fork 308. Conversely thereof, when the rewind motor M3 rotates in the counterclockwise direction, the planetary lever 306 turns in the counterclockwise direction, thereby the small gear 304b is taken out of engagement with the gear 307. Therefore, the rotating force cannot be transmitted to the fork 308. For this reason, by rotating the rewind motor M3 by some angle in the counterclockwise direction, it is made possible that when in the film winding up by the windup motor M2, the rewind transmission system K3 and the rewind motor M3 are not added to the winding-up load, and, therefore, that the film is wound up with low load.

Figure 7:
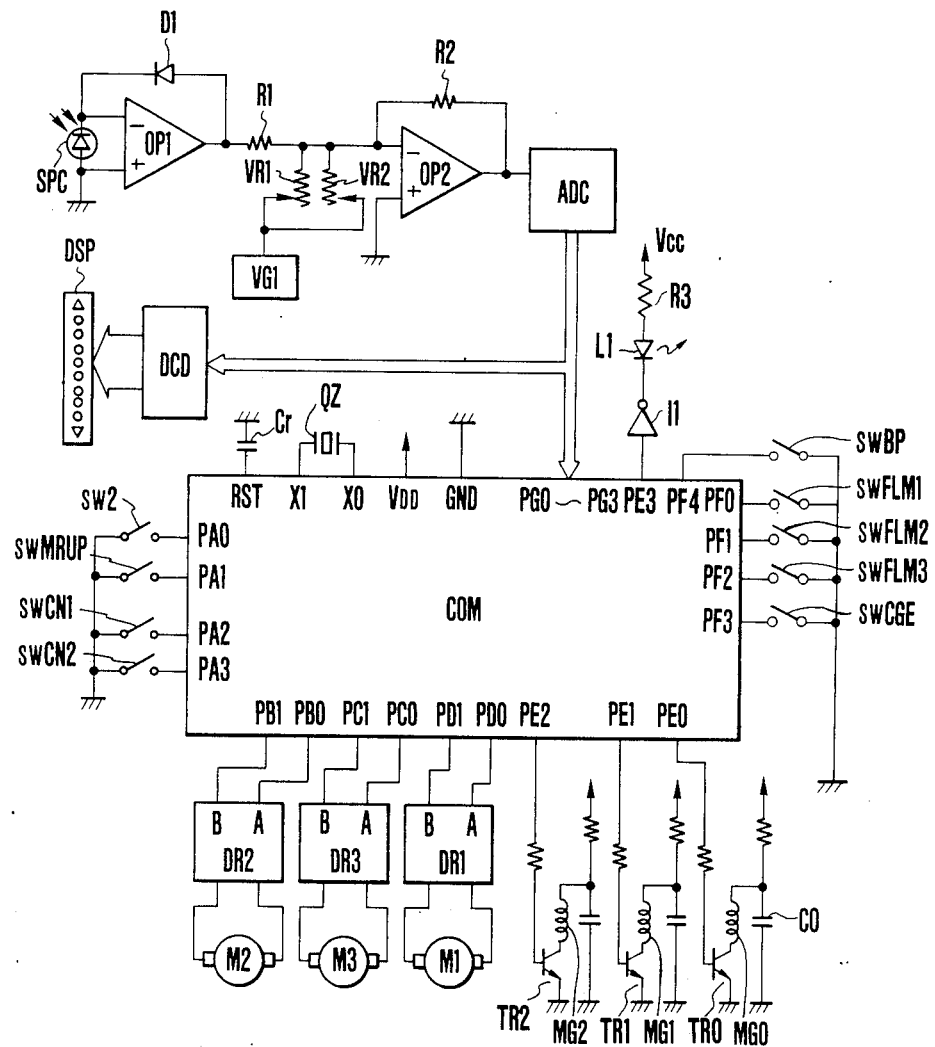
FIG. 7 is an electrical circuit diagram of a microcomputer and its peripheral circuits.

FIG. 7 illustrates a practical example of an electrical circuit using a micro computer COM as the control means 1.

A light-receiving element SPC receives the reflected light from an object to be photographed and inputs a light-receiving signal to an operational amplifier OP1 of high input impedance with a compression diode D1 connected in a feedback circuit. The operational amplifier OP1 produces logarithmically compressed object brightness information Bv through a resistor R1. Variable resistors VR1 and VR2 connected to a constant voltage source VG1 produce film sensitivity information Sv and aperture value information Av. An operational amplifier OP2 having a resistor R2 connected in the feedback circuit computes shutter time information Tv=(Bv+Sv−Av) and produces an output. The shutter time information Tv is converted by an A/D converter ADC to a 4-bit digital value which is applied through a decoder driver DCD to be displayed in a display device DSP within a finder and is inputted to input ports PG0-PG3 of the microcomputer COM. For note, of the 4-bit codes, 0001-1000 correspond to 1/1000 sec. $-\frac{1}{8}$ sec. and 0000 and not less than 1001 correspond to display elements for warning.

When a first stroke switch (not shown) is turned on by the first stroke of a release button, an electrical power source voltage Vcc is supplied to all circuits. In the figure, the upward pointed arrows represent Vcc, and circuit blocks not marked by such arrows, for example, the operational amplifiers and the A/D converter, are also supplied with the electrical power source voltage Vcc, of course. Even after the first stroke switch is turned off, the supply of the electrical power source voltage Vcc is sustained for a prescribed time.

Connected to a terminal RST of the microcomputer COM is a capacitor Cr; to terminals X0 and X1 are a quartz oscillator QZ; to a terminal VDD is the electrical power source Vcc; to a terminal GND is the ground.

Connected to the input ports PA0-PA3 are respectively a second stroke switch sw2 which turns on by the second stroke of the release button, a mirror-up switch swMRUP which turns off when mirror up, and on when mirror down, a leading curtain switch swCN1 which turns off when the running of the leading curtain has completed, and on when the charge has completed, and a trailing curtain switch swCN2 which turns off when the running of the trailing curtain has completed, and on when the charge has completed.

Connected to the input ports PF0-PF3 are respectively a first film switch swFLM1 comprising the pulse substrate P1 and the contact member S1 (FIG. 5), a second film switch swFLM2 comprising the pulse substrate P2 and the contact member S2 (FIG. 5), a third film switch swFLM3 comprising the pulse substrate P2 and the contact member S3, and a charge switch swCGE comprising the signal substrate fixedly mounted on the cam gear 109 (FIG. 4) and the contact member S0 and arranged to turn on when the charging has completed. Also connected to the input port PF4 is a back cover switch swBP which turns on and off when the back cover of the camera opens and closes.

Connected to the output ports PE0-PE2 are the bases of transistors TR0-TR2. The transistors TR0-TR2 respectively control a permanent magnet-equipped first latch magnet MG0 for starting a mechanical release operation, a leading curtain magnet MG1 for causing the leading curtain to run down, and a trailing curtain magnet MG2 for causing the trailing curtain to run down. Connected to the output port PE3 is the cathode of a light-emitting diode L1 through an inverter I1. Applied to the anode of the light-emitting diode L1 through a resistor R3 is the electrical power source voltage Vcc. The light-emitting diode L1 when lighted on warns an auto-loading miss.

Figure 8:
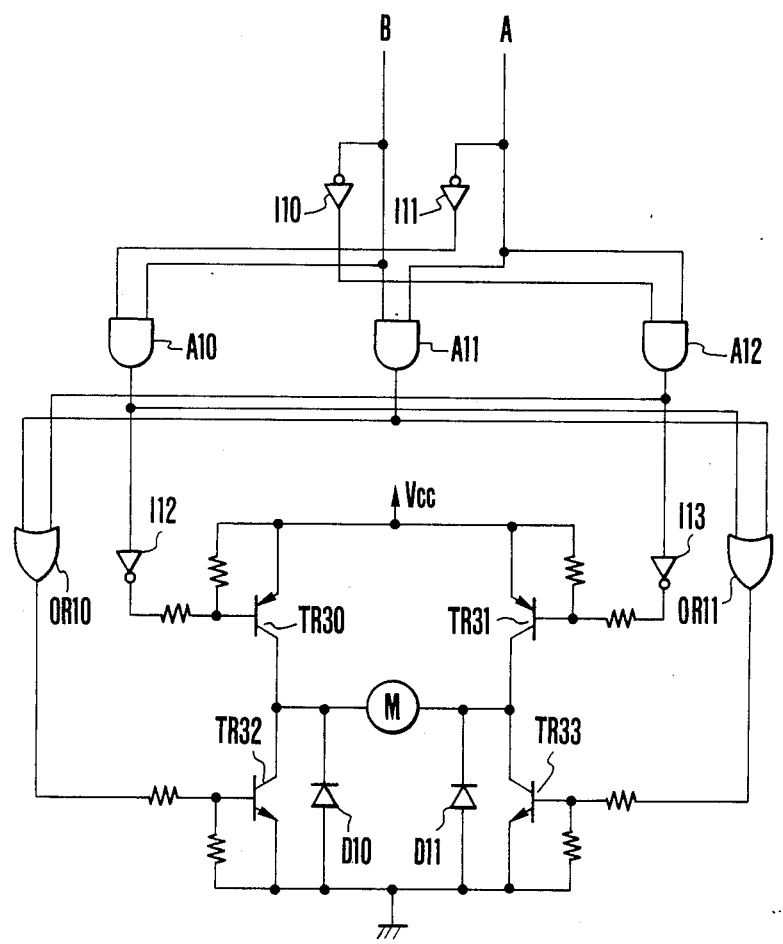
FIG. 8 is an electrical circuit diagram illustrating a drive circuit.

The output ports PB0, PB1 are connected to a drive circuit DR2 for driving the windup motor M2. The output ports PC0, PC1 are connected to a drive circuit DR3 for driving the rewind motor M3. The output ports PD0, PD1 are connected to a drive circuit DR1 for driving the charge motor M1. The drive circuits DR1-DR3 have the same structure which is shown in FIG. 8. A 2-bit signal enters a pair of input terminals A and B. At first, on assumption that A=1, B=0, because the signal of the input terminal B is inverted by an inverter I10, the output of an AND gate A12 becomes 1, and the output of an OR gate OR10 also becomes 1, causing a transistor TR32 to turn on. Furthermore, the output of an inverter I13 becomes 0, so that a transistor TR32 also turns on. Therefore, the electrical power source voltage Vcc is applied to the motor M, and, as current flows therethrough, the motor M rotates in a prescribed direction.

When A=0, B=1, because the signal of the input terminal A is inverted by an inverter I11, the output of an AND gate A10 becomes 1, the output of an OR gate OR11 also 1, and the output of an inverter I12 becomes 0, causing transistors TR30, TR33 to turn on. This means that current flows in the reversed direction to the motor M, and the motor M rotates in the reverse direction.

When A=1, B=1, the output of an AND gate A11 is 1, and the outputs of the OR gates OR10, OR11 also become 1, causing the transistors TR32, TR33 to turn on. Therefore, when this mode takes place at a time during the rotation of the motor M, the current supply is cut off by diodes D10, D11, and the transistors TR32, TR33 regardless of which the motor M is rotating in, and, moreover, the ends of the winding of the motor M are short-circuited to brake the motor M against the inertia rotation.

When changed to A=0, B=0, the outputs of the AND gates A10-A12 all become 0, and the transistors TR30-TR33 all turn off, thereby the motor M is opened.

Figure 10:
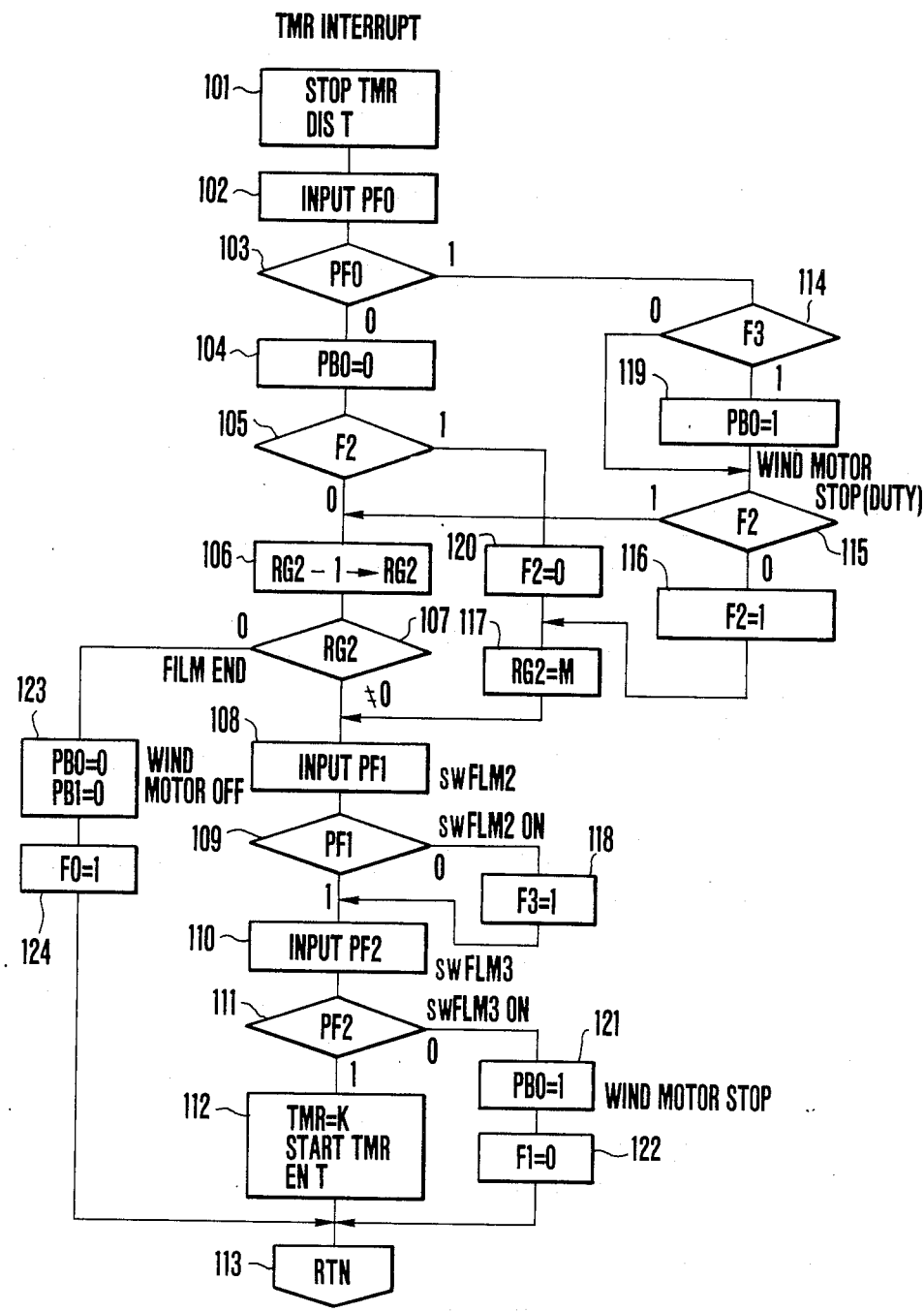

The usual operation of the micro computer COM is described by the flow chart of FIGS. 9A, 9B and 10.

Step 1: The electrical power source voltage Vcc is supplied to the terminal $V_{DD}$, thereby the micro computer COM is rendered operative. A supply of the basic clock from the quartz oscillator QZ is received, and, at the same time, a power-on reset is applied by the capacitor Cr. A built-in program counter is initially set to 0 address, and the program begins with the start. Also, each of all flags are assumed to become 0, and the output ports also to become 0.

Step 2: A signal from the back cover switch swBP connected to the input port PF4 is inputted.

Step 3: If, as the back cover is open, the back cover switch swBP is off, advance to a film auto-loading treatment (BP OPEN) beginning with step 130. About this film auto-loading treatment, explanation will be made later. Now assuming that the film has already been loaded with the back cover closed, and the back cover switch swBP is on, advance to a step 4.

Step 4: Receive the inputs from the input ports PA0-PA3 (hereinafter referred to as "PA" inputs, and the same holds for the other ports). If the charging of the various portions is in completion, when the photographer pushes the release button to the second stroke, PA0=PA1=PA2=PA3=0 results. So, the PA input has a value of 00H in the hexadecimal number system.

Step 5: If the PA input is not 00H, the loop of the steps 2-5 is repeated. When the PA input is 00H, that is, when the photographer has pushed the release button down to the second stroke, the camera enters an exposure mode.

Step 6: Input an Apex value Tv of the shutter time in the form of a 4-bit digital value from the A/D converter ADC. Because of the four bits, it can take up to 0-15 in the decimal number system.

Step 7: Since the PG input inputted in the step 6 lies in an accumulator A, transfer this value to an internal register RG1.

Step 8: Change the PE0 output to 1 to turn on the transistor TR0. So, the capacitor C0 charged to almost the same voltage as the electrical power source voltage Vcc is discharged to the first latch magnet MG0, thereby a mechanical release operation is initiated.

Step 9: Make a waiting time by a constant time timer. This program may be such that a value is put in the accumulator A and then decremented one by one until A=0 to create a time which is for use in that purpose. Because of its flow being complicated, it is omitted. For note, the same holds for TIME2-TIME5.

Step 10: Change the PE0 output to 0 to cut off the current supply to the first latch magnet MG0. TIME1 may be set to be slightly longer than the minimum time for which the first latch magnet MG0 is energized. After that, enter a mechanical sequence of closing down the diaphragm and moving the mirror upward as is known in the art.

Step 11: Receive the PA1 input representing the state of the mirror. Since the first latch magnet MG0 is released, the mirror will reach the terminal end of upward movement in a certain time.

Step 12: A routine for waiting time till that terminal end is reached. When that terminal end is reached, advance to a step 13. This routine is set forth in order that before the shutter operates, it is ascertained that the light path to the shutter is cleared of the mirror.

Step 13: Test the flag F0. F0=1 represents the film end.

Step 14: Test the flag F1. F1=0 represents the termination of each cycle of film winding.

Step 15: Examine whether or not the value of the internal register RG1 is 0. As has been described above, when the shutter time becomes shorter than 1/1000 sec., the PG input becomes 0000, or RG1=1.

Step 16: In the case of RG1=0, forcibly fix to RG1=1, or 1/1000 sec.

Step 17: Examine whether or not RG1>8, or it becomes longer than ⅛ sec.

Step 18: In the case of RG1>8, forcibly RG1=8, that is, employ a fixed value of ⅛ sec.

Step 19: Enter 1 into the accumulator A. A routine of the steps 19-22 is to expandingly converting the value of the internal register RG1 representing the shutter time to a multiple series.

Step 20: Subtract 1 from the value of the internal register RG1 and again enter it into the internal register RG1.

Step 21: Test RG1=0. If it becomes 0, advance to a step 23, if not 0, to a step 22.

Step 22: Left shift the content of the accumulator A. In other words, make it a doubled value. If the accumulator A is of 8 bits, for example, RG=8, the content of the accumulator A is left shifted seven times. Therefore, the first content of the accumulator A is changed from 00000001 to 10000000.

Step 23: Transfer the content of the accumulator A to the internal register RG1. Thereby, the shutter time is expanded to the multiple series.

Step 24: Change the PE1 output to 1, causing current supply to the leading curtain magnet MG1. At this stage, the leading curtain starts to run down.

Step 25: Wait for a time by the constant time timer.

Step 26: Decrement the content of the internal register RG1 by 1.

Step 27: Repeat the steps 25-27 till it becomes RG1=0. Thereby, the actual value of the shutter time is counted.

Step 28: Change the PE2 output to 1, causing the trailing curtain magnet MG2 to be supplied with current, and the trailing curtain to run down. Thus, the control of the focal plane shutter ends.

Step 29: Make a time necessary for the trailing curtain to complete its running down by a constant time timer.

Step 30: Reset PE1=PE2=0 to cut off the current supply to the leading curtain magnet MG1 and the trailing curtain magnet MG2.

Step 31: Receive the input from the trailing curtain switch swCN2.

Step 32: A routine for waiting till the trailing curtain switch swCN2 turns off, that is, the running down of the trailing curtain is completed. Upon completion, advance to a step 33.

Step 33: Set PD0=0, PD1=1, thereby the drive circuit DR1 is rendered operative to energize the charge motor M1. By this, the shutter, mirror, automatic diaphragm and others are charged.

Step 34: Make a waiting time for waiting till the current flowing to the charge motor M1 stabilizes as the starts of current supply to the charge motor M1 and the windup motor M2 are staggered. This makes it possible to prevent the rush current of the initial stage of current supply from overlapping.

Step 35: Set PB0=0, PB1=1, thereby the drive circuit DR2 is rendered operative to rotate the windup motor M2. By this, the film is wound up.

Step 36: Set a constant K to a timer TMR for timer interruption. The value of the constant K is determined by the winding speed of the film, the number of equally divided parts of the pulse substrate P1 (FIG. 5) and the period of the instruction cycle of the micro computer COM.

Step 37: Start the timer TMR for timer interruption. Make the timer interruption possible (EN T). Input a ocnstant M to the internal register RG2. Set flags F0=F2=F3=0, F1=1. The flag F2 represents the on-off state of the first film switch swFLM1. The flag F3 represents the on-off state of the second film switch swFLM2. Now that the timer TMR has started, it follows that, independently of the main program routine, the timer TMR repeats decrement. So, in each prescribed time depending on the constant K, interruption takes place with a jump from the program in execution to a particular timer interruption address. Here, the timer interruption treatment is explained by reference to FIG. 10.

Timer Interruption Treatment:

Step 101: Hinder the decrement operation and interruption of the timer TMR.

Step 102: Receive the PF0 input from the first film switch swFLM1.

Step 103: If PF0=0, advance to a step 104, or if PF0=1, to a step 114.

Step 104: Since PB0=0 is not different from what has been set in the step 35, the current supply to the windup motor M2 is continued.

Step 105: Test the flag F2. Since F2=0 has been set in the step 37, advance to a step 106.

Step 106: Decrease the content of the internal register RG2 by 1.

Step 107: Test if RG2=0. Since, in the up-to-present step of program, RG2=M−1, on assumption that M has a somewhat large value, because it does not become 0, advance to a step 108.

Step 108: Receive the PF1 input from the second film switch swFLM2.

Step 109: Test if PF1=0. If the film is not sent just before the length of one frame, PF1=1 results. So advance to a step 110.

Step 110: Receive the PF2 input from the third film switch swFLM3.

Step 111: Test if PF2=0. If the 1-frame winding up of the film is not completed, PF2=1 results. So advance to a step 112.

Step 112: Reset the constant K to the timer register to start the timer TMR, making interruption possible.

Step 113: Returns to the original program in execution. The timer interruption treatment has its aim in going from the program in execution out to test the states of the three film switches swFLM1, swFLM2 and swFLM3 in every prescribed time. Since the program itself is executed at a very high speed for each instruction, no problem is assumed to actually arise when the film winding up information is inputted in every prescribed time.

Now assuming that in a certain cycle of timer interruption treatment the first film switch swFLM1 turns off, then advance from the step 103 to a step 114.

Step 114: Test if the flag F3=1. Since, in the step 37, F3=0 has been set, advance to a step 115.

Step 115: Test if the flag F2=1. Since, in the step 37, F2=0 has been set, advance to a step 116.

Step 116: Set the flag F2 to 1. This means that the first film switch swFLM1 has turned off, or a change to PF0=1 has occured.

Step 117: Set the constant M again to the internal register RG2. Then advance to the step 108 where the above-described routine is executed. As, here, the winding up is carried out for a while, when the 1-frame winding up reaches a point just before the end, the second film switch swFLM2 is then turned on, causing a change to PF1=0. So advance from the step 109 to a step 118.

Step 118: Set the flag F3 to 1. Therefore, by the subsequent timer interruption treatment, advance from the step 114 to a step 119.

Step 119: Set PB0=1. Since, in the step 35, PB1=1 has already been set, the current supply to the windup motor M2 is cut off, and then braked. Because of its inertia, however, the windup motor M2 cannot stop immediately, continuing rotating. By the subsequent timer interruption treatment, the first film switch swFLM1 will turn from off to on. At this time, advance from the step 103 to the step 104. Since the PB0=0 results again, the windup motor M2 is supplied with current again. At this time, since, in the step 116, the flag F2=1 has already been set, advance to a step 120.

Step 120: Set the flag F2=0, and then, in the step 117, set the constant M to the internal register RG2. Therefore, when the second film switch swFLM2 turns on, or the winding up nears the completion, as the first film switch swFLM1 turns on and off, the windup motor M2 is controlled in a repetitive manner that the current supply →braking→current supply braking and so on, (duty control), its speed decreasing.

When the 1-frame winding up of the film has completed, the third film switch swFLM3 turns on. So, advance from the step 111 to step 121.

Step 121: Similarly to the step 119, brake the windup motor M2.

Step 122: Set the flag F1=0. This is the flag representing the completion of the winding up. Then, in the step 113, return to the original program. Since the step 112 is not passed through, the interruption no longer takes place again.

Next, on assumption that the used film is of 24 exposures, then when the last or 24th frame has been exposed, the windup motor M2 does wind up the film, but the film cannot move any more. So, the on-off of the first film switch swFLM1 no longer changes. Therefore, the flag F2 does not change as fixed to 0 or 1. As, in the step 106, the content of the internal register RG2 is subtracted one by one, RG2=0 is reached in a number of cycles of timer interruption treatment. Then, advance from the step 107 to a step 123.

Step 123: Set PB0=PB1=0. Both ends of the winding of the windup motor M2 are opened.

Step 124: Set the flag F0=1. This represents the film end.

The above-described timer interruption treatment is always executed from the step 37 of the main routine to the step 15 in the next shot, performing the film winding up control accurately.

Let us return to the description of the main program routine.

Step 38: Input the signal from the charge switch swCGE representing that the charging of the shutter, mirror, automatic diaphragm and others has completed.

Step 39: This step constitutes a routine for waiting till the completion of the charging together with the step 38. Of course, during this time, the timer interruption treatment is carried out a number of times.

Step 40: Change the PD0 output to 1, thereby the charge motor M1 is braked.

Step 41: Test the flag F0 representing the film end. Now assuming that the film is not in the end, then advance to a step 42.

Step 42: This step is similar to the step 4.

Step 43: In case the photographer makes a continuous series of shots, because the second stroke switch sw2 continues to be on, the PA input becomes 00H in the hexadecimal number system. So, jump to NEXT (step 6). From the step 6, as has been described above, the photographic sequence advances. What should be particularly mentioned is that without ascertaining the completion of the film winding up, the current supply to the first latch magnet MG0 is allowed to occur in a step 8. That is, the closing down of the diaphragm and the upward moving of the mirror which are not directly related to the actual exposure are made carried out irrelevantly of the winding up completion to achieve a speedup. After that, the mirror up is ascertained in a step 12, and the winding up is ascertained in a step 14. Up to here, the timer interruption occurs a number of times. If the winding up is completed, advance to the next shutter control.

Next described is about the shooting of only one frame. After one frame of the film has been exposed, the photographer ought not to push the release button to the second stroke. So advance from the step 43 to a step 44.

Step 44: Repeat the steps 41–44 until the winding up completion is ascertained by the timer interruption treatment, or F1=0 is reached. Upon completion of the winding up, returns to START (step 1). In case when the release button is not pushed down even to the first stroke, the supply of the electrical power source voltage Vcc is stopped (the photographic sequence ends).

Rewind Treatment:

When the film has ended midway through a winding up thereof, the timer interruption treatment results in the flag F0=1. So branch from the step 41 to a step 45.

Steps 45–47: Similarly to the steps 28–30, supply current to the trailing curtain magnet MG2 for a prescribed time, causing the trailing curtain to run down. This is because the film is prevented from being fogged during the rewinding despite the photographer carelessly detaches the lens and strong light rays impinge on the shutter curtains. Because both of the leading and trailing curtains exist in the aperture, any light leak to the film surface can be perfectly prevented.

Step 48: Input a signal from the trailing curtain switch swCN2.

Step 49: Wait for the completion of the running down of the trailing curtain. Upon completion, advance to a step 50.

Step 50: Set PC0=0, PC1=1, causing the rewind motor M3 to rotate.

Step 51: Set the internal register RG2 to M1.

Steps 52–60: As these steps are similar to the program for detecting the movement of the film described in connection with the steps 102, 103, 105, 106, 107, 115, 116, 117, 120 of the timer interruption treatment, when the rewinding ends, the sprocket 29b no longer rotates and this is detected here. Upon detection of the completion of the rewinding, advance to a step 61.

Step 61: Change to PC0=1, stopping the rotation of the rewind motor M3.

Step 62: Reset the flag F0 representing the film end to 0.

Step 63: Change to PD0=0, PD1=1, causing the charge motor M1 to rotate. For, as in the step 45, the trailing curtain ran down before the rewinding, the shutter mechanism is reset to the charged position.

Step 64: Input a signal from the charge switch swCGE.

Step 65: Wait for the completion of the charging. Then advance to a step 80.

Step 66: Stop the rotation of the charge motor M1. Hence the rewinding treatment is all ended, and return to START (step 1).

Next, let us consider a case where during the continuous series of shots, the charging of the shutter, mirror and automatic diaphragm ends early, and the winding up does not complete yet, but it is after the first latch magnet MG0 has been supplied with current for the next exposure by the steps 8–10 that the film ends.

Since, in this case, the mechanical release operation is actuated by the first latch magnet MG0, the closing down of the diaphragm and the upward moving of the mirror are carried out, but the film stops in the middle of a course of winding up, and as it is no more wound up, the third film switch swFLM3 remains off. Therefore, if, whilst it is left unchanged, the film is rewound, the photographer will mistake that the shutter is open and probably make a faulty operation. Also, the entrance of strong light through the lens will cause the film to be fogged with high possibility. For these reasons, it is better to move the mirror down before the film is rewound.

After, in the step 12, the mirror up has been ascertained, the completion of the winding up is waited for in the steps 13, 14. Upon detection of the film end by the timer interruption treatment, the flag F0=1 is set in the step 124. So, in the step 13, branch to a step 67.

Step 67: Change PD0=0, PD1=1, causing the charge motor M1.

Steps 68–69: Detect the charge completion.

Step 70: Change PD0=1, braking the charge motor M1. In this state, the mirror is charged and, as it moves down, returns to the initial position. Next jump to RWND (step 45), and perform the rewinding treatment.

Film Auto-Loading Treatment:

When the back cover of the camera is open, the flow branches from the step 3 to a step 130 (BP Open). This film auto-loading treatment is explained by reference to FIG. 11.

Step 130: Start the film auto-loading treatment.

Steps 131–132: A routine for waiting till the back cover is closed. The photographer inserts a film cartridge into the cartridge chamber 310, and puts the leader of the film on the drive sprocket 29a and the sprocket 29b. Then when he closes the back cover, the PF4 input becomes 0, and a step 133 follows.

Step 133: By changing to PB0=1, PB1=0, the drive circuit DR2 is rendered operative, causing the windup motor in the counterclockwise direction. Thereby, the planetary lever 219a changes over to the low-speed gear train side of large speed reduction ratio, and the spool 211 and the drive sprocket 29a start to rotate.

The film is first sent on into the spool chamber by the rotation of the drive sprocket 29a. When the tip of the leader reaches the spool 211, it is snatched up by the spool 211. The film is then convoluted on the spool 211 by friction. Once the film convolutes on the spool 211, because the spool 211 has a faster winding up speed than the drive sprocket 29a, the film is pulled out by the spool 211.

Step 134: Steps 134–142 is a routine for detecting an auto-loading miss due to the unloading of the film or an insufficient pullout of the leader of film. In this step, a value of 1 sec. is set in a timer.

Step 135: Input a signal from the first film switch swFLM1.

Step 136: If the first film switch swFLM1 is on, advance to a step 137, or if off, to a step 140.

Steps 137–139: Examine whether or not the first film switch swFLM1 has changed from on to off in a period to the end of a counting of the set timer. If the film is normally sent, the sprocket 29b also rotates in following-up relation to the film, so that the first film switch swFLM1 repeats on-and-off. If, as the perforations of the film are not in engagement with the sprocket 29b, the film is not sent, the sprocket 29b does not rotate, leaving the first film switch swFLM1 not to change over. Therefore, when the film is correctly being sent, advance to a step 143. When not sent, the loop of the steps 137–139 repeats itself. Then when 1 sec. has passed as it is, branches to AL FAIL2. The AL FAIL2 means the auto-loading miss due to the unloading of the film or the insufficient pullout of the leader.

Steps 140–142: Examine whether or not the first film switch swFLM1 has changed from off to on during the time until the counting of the set timer ends. Similarly to the steps 137–139, if it has changed, advance to a step 143, or if not, branches to AL FAIL2.

Step 143: Set 3 in the internal register RG2.

Step 144: Set a time long enough to send one blank frame of film, for example, 1 sec. in the timer.

Steps 145–147: A routine for, as the third film switch swFLM3 is initially on, waiting for the change to off. If initially off, immediately advance to a step 148. Here, if it does not change within 1 sec., as this is taken as an auto-loading miss, branches to AL FAIL.

Steps 148–150: A routine for waiting for the change of the third film switch swFLM3 from on to off. If it changes, it implies that the film is sent in vain from the initial position to a position where the third film switch swFLM3 is on. Here, if it does not change within 1 sec. this is taken as an auto-loading miss, branches to AL FAIL.

Step 151: Since, in the steps 145–150, the film has been sent in one blank frame (actually from the initial position to the ON position of the third film switch swFLM3), subtract 1 from the internal register RG2.

Step 152: Test if the value of the internal register RG2 is 0. If not, return to the step 144. Therefore, the loop of the steps 144–152 is repeated until 0, or the first three frames of film are sent in vain.

Step 153: Brake the windup motor M2 by PB0=1, PB1=1.

Steps 154–155: Set 100 milliseconds to the timer and wait for this time.

Step 156: Change the rotation of the windup motor M2 to the clockwise direction by PB0=0, PB1=1. Thereby, the planetary lever 219a is moved to select the high speed gear train of small speed reduction ratio, so that the spool 211 only is driven. The drive sprocket 29a and the sprocket 29b are cut off from the windup motor M2, and become driven.

Steps 157–163: Exactly the same as the steps 144–150. Here, whether or not the sending of the last one blank frame by the spool drive has been normally performed is detected. In case when the film is loosely convoluted, in other words, while the film has been sent by the drive sprocket 29a into the spool chamber, it is not frictionally connected to the spool 211, the film does not move, and the sprocket 29b also does not rotate, leaving the third film switch swFLM3 not to change over. Taking this as the auto-loading miss, branch to AL FAIL.

Step 164: Brake the windup motor M2 by PB0=1, PB1=1, and stop the film.

Step 165–166: Set 100 msec. to the timer, and wait for that time.

Step 167: Open both ends of the windup motor M2 by PB0=0, PB1=0.

Step 168: Since the auto-loading has succeeded, return to START (step 1).

Step 170: When branched to AL FAIL, advance to this step has occurred.

Step 171: Open both ends of the windup motor M2 by PB0=0, PB1=0.

Steps 172–193: A similar treatment to the rewinding treatment of the steps 45–66. In case when the film is loosely convoluted, because two or more frames have been sent by the drive sprocket 29a, there is need to send back the film. Therefore, similarly to the above-described rewinding treatment, the trailing curtain is run down, then the film is rewound, and then the shutter is charged. After the charging of the shutter has been completed, advance to a step 194.

Step 194: When branched to AL FAIL2, the advance to this step has occurred. By a change to PB0=0, PB1=0, the current supply to the windup motor M2 is cut off. Since, in the steps 137, 140, the film was not sent at all before branched to AL FAIL2, there is no need to do the rewinding.

Step 195: Change the output of the output port PE3 to 1. Thereby, the light-emitting diode L1 is supplied with current, emitting light to warn the auto-loading miss.

Steps 196–197: Input a signal from the back cover switch swBP, and wait till the back cover opens.

Step 198: When the back cover opens, stop the light emission of the light emitting diode L1.

Step 199: Return to START (step 1).

Figure 12:
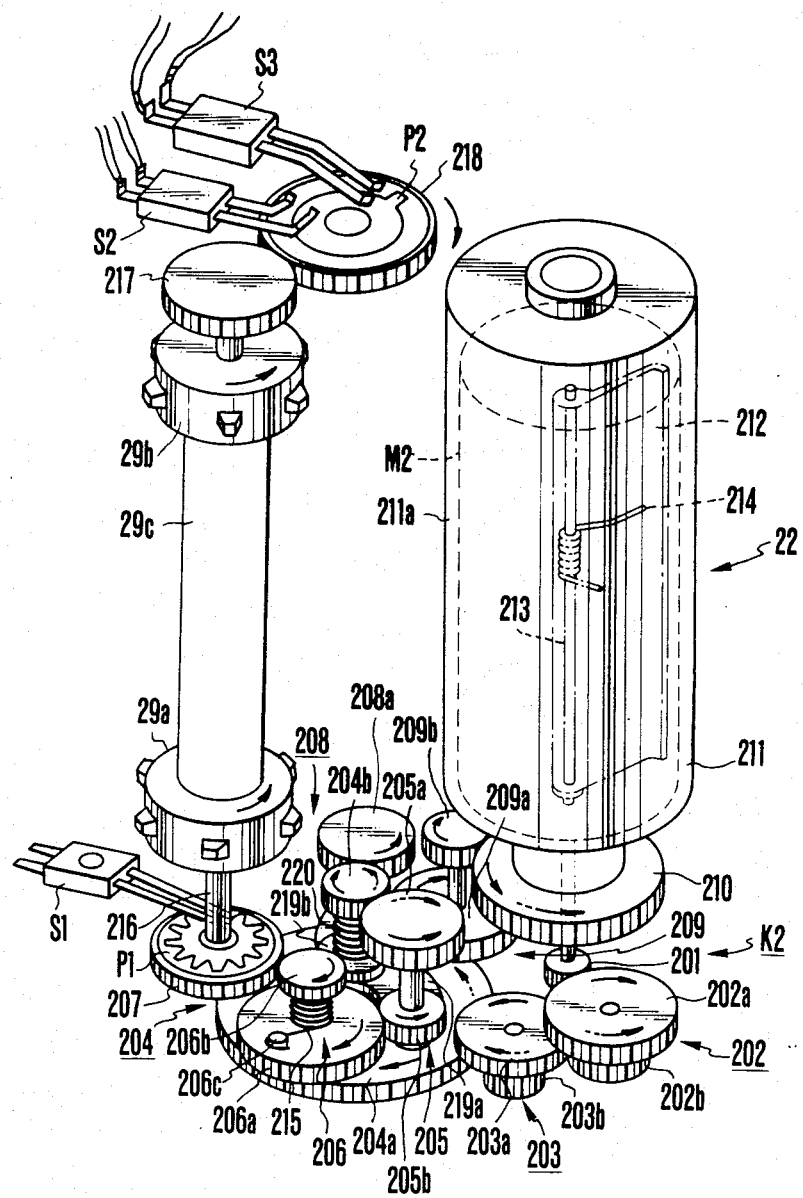
FIG. 12 is a perspective view of a windup transmission system in a second embodiment of the invention.

Though, in FIG. 5, the sprocket 29b is drivenly connected through the film to the drive sprocket 29a, the drive sprocket 29a and the sprocket 29b may be mechanically connected to each other by the shaft 29c as shown in FIG. 12 for a second embodiment. The pulse substrate P1 is fixedly mounted to the gear 207.

In this or second embodiment, the set of the contact member S1 and the pulse substrate P1 and the set of the contact members S2, S3 and the pulse substrate P2 are operatively connected to the drive sprocket 29a. For this reason, even if the film is not in engagement with the drive sprocket 29a, the counterclockwise rotation of the windup motor M2 always results in producing signals from the contact members S1–S3. Yet, in the end stage of the film auto-loading, where the last one blank frame is sent by the spool drive, the drive sprocket 29a and the sprocket 29b are made to follow up the movement of the film. Therefore, no hindrance is brought about to the detection of the auto-loading miss.

Figure 13:
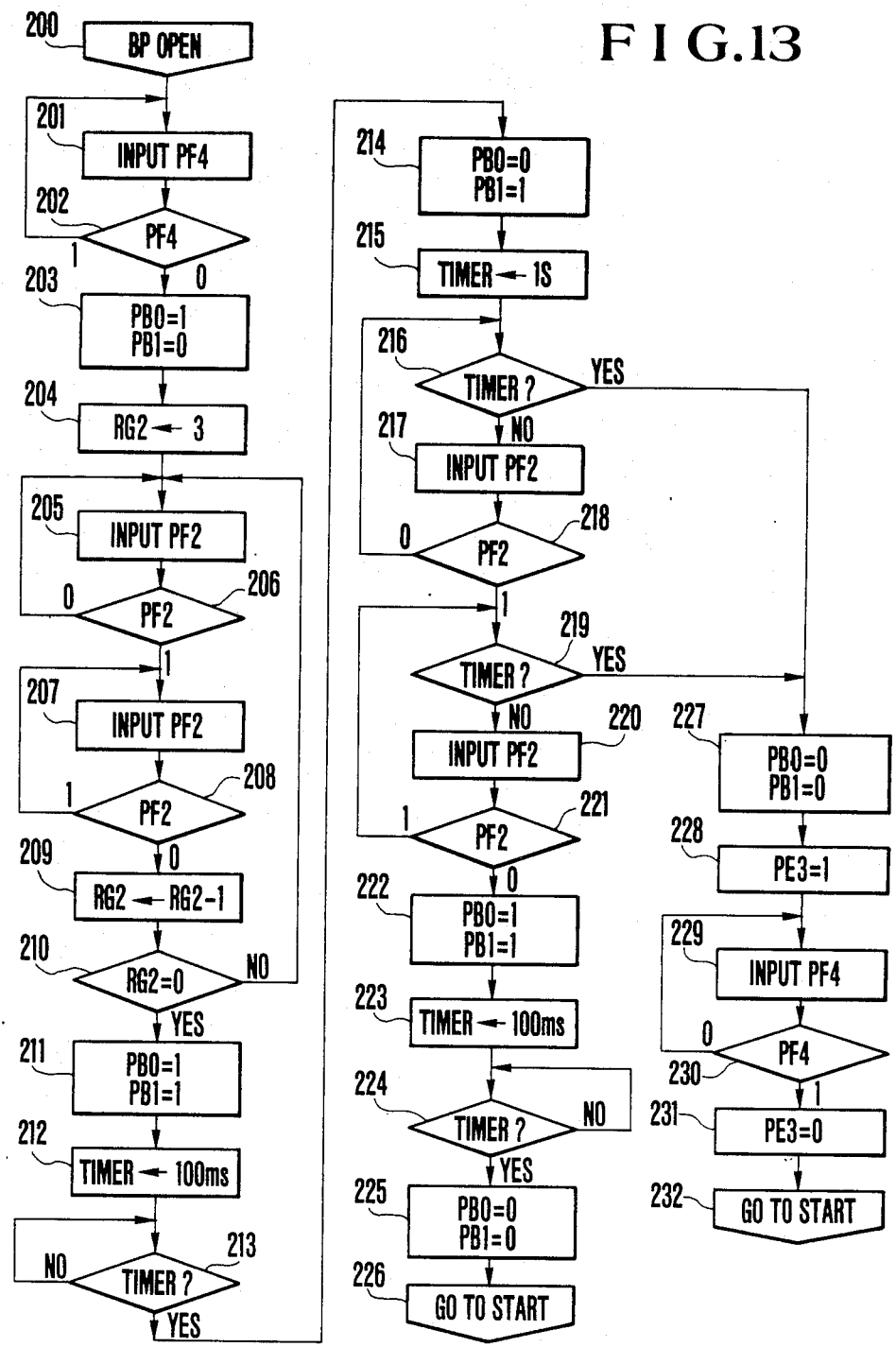
FIG. 13 is a flow chart of the auto-loading treatment.

The auto-loading treatment of the second embodiment of FIG. 12 is shown in FIG. 13.

Figure 11:
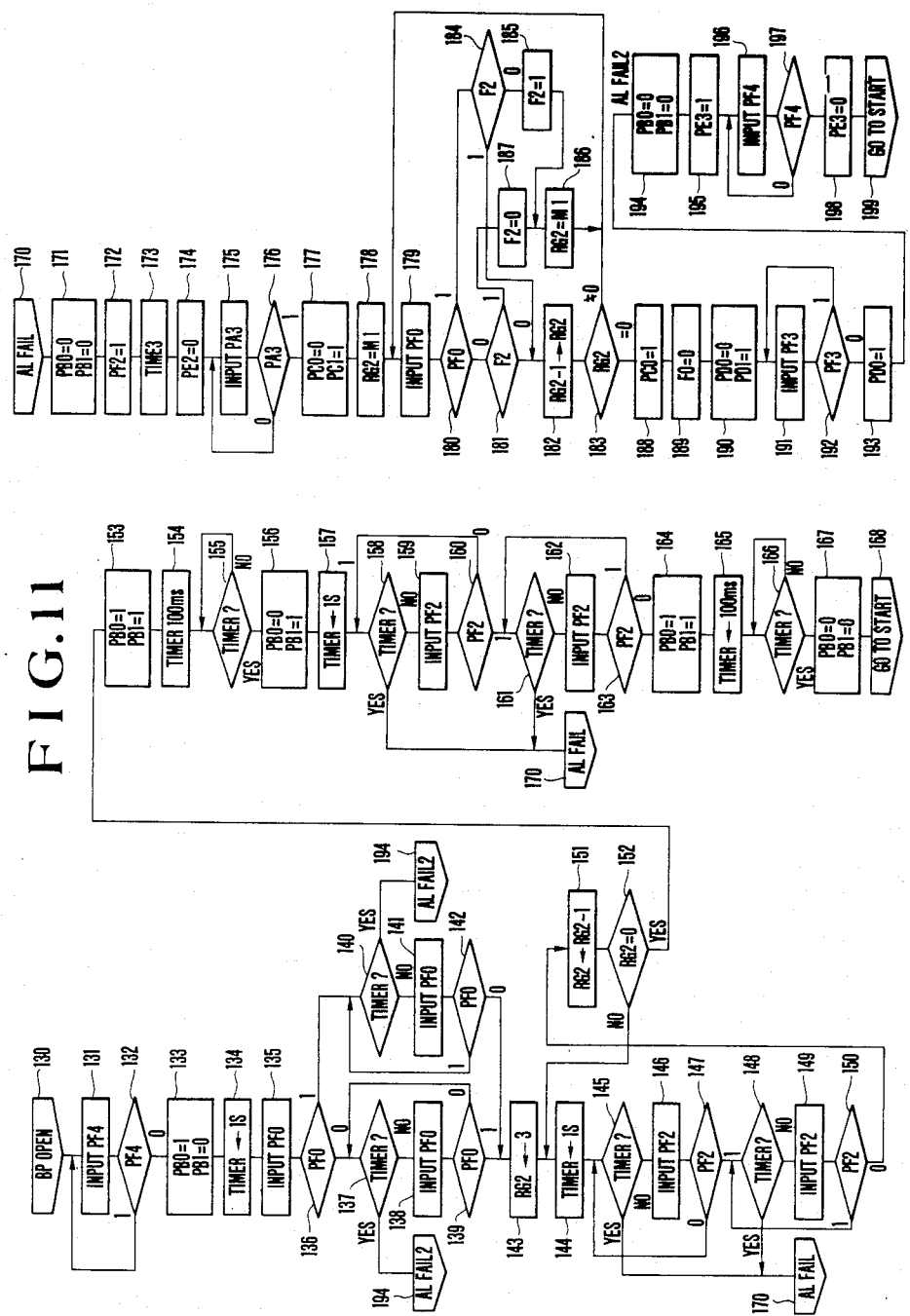

Step 200–203: Similarly to the steps 130–133, when the back cover is closed, the windup motor M2 is rotated in the counterclockwise direction, driving the spool 211, drive sprocket 29a and sprocket 29b. Because of this, even if the film is not sent, the first film switch swFLM1 changes over. Therefore, the steps 134–142 of FIG. 11 are unnecessary.

Step 204: Similar to the step 143.

Steps 205–206: Wait for the third film switch swFLM3 becoming off. Because the third film switch swFLM3 changes over without exception regardless of the film being not sent, such a timer as of FIG. 11 is unnecessary. Also, here, the auto-loading miss cannot be detected.

Steps 207–208: Wait for the change of the third film switch swFLM3 to on.

Steps 209–210: Similar to the steps 151–152. The loop of the step 205–210 is repeated until the internal register RG2 becomes 0, or three blank frames are sent.

Steps 211–213: Similar to the steps 153–155. Brake the windup motor M2 and wait for a time of 100 msec.

Steps 217–226: Similar to the steps 159–168. Rotate the windup motor M2 in the clockwise direction. Thereby the spool drive takes place, while the drive sprocket 29a and the sprocket 29b become driven. Then, whether or not the sending of the last one blank frame by the spool drive has been normally performed is detected. When the third film switch swFLM3 does not change over, it is taken as the auto-loading miss. Then, branch to a step 227. If normal, brake the windup motor M2 and stop the film. After that, open both ends of the windup motor M2 and return to START (step 1).

Steps 227–232: Similar to the steps 194–199. After the current supply to the windup motor M2 is stopped, change the output of the output port PE3 to 1. Thereby the light-emitting diode L1 is supplied with current, emitting light to warn the auto-loading miss. When the back cover opens, stop the emission of the light-emitting diode L1.

As has been described above, according to the first and second embodiments of the invention, there are provided control means for causing both of a spool and a sprocket to be driven by the windup drive system from the initial stage to before the end stage of the film auto-loading and for causing only the spool to be driven by the windup drive system when in the end stage of the auto-loading, and detecting means for detecting that the film is not set in the end stage of the film auto-loading, whereby the film blank sending in the end stage of the film auto-loading is performed by the spool drive. As, at that time, the film is not tightly convoluted on the spool, the film is not sent, this is made detectable. So, the state of the film not tightly convoluted on the spool can be immediately detected when in the auto-loading.

Figure 14:
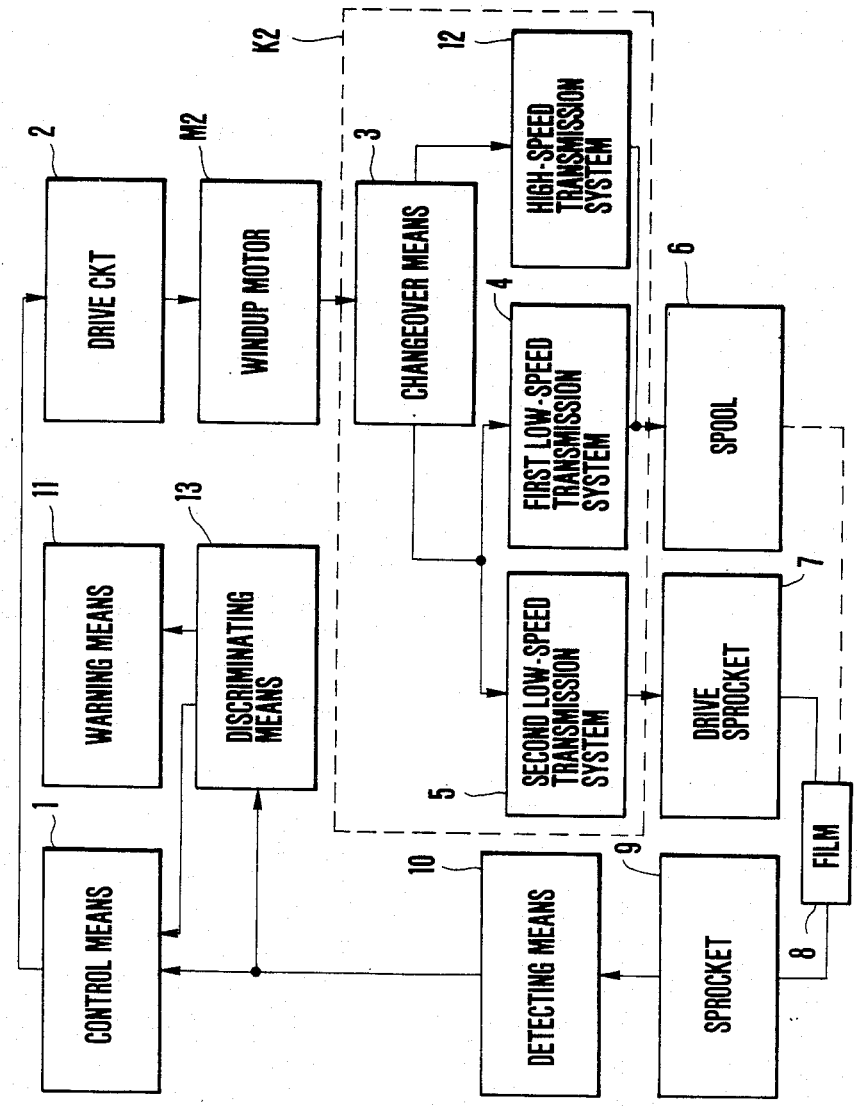
FIG. 14 is a block diagram illustrating a third embodiment of the invention.

Next, by FIG. 14, the fundamental structure of a third embodiment of the invention is shown. The similar parts to those shown in FIG. 1 are denoted the same reference characters and their explanation is omitted. A newly added feature in this or third embodiment is discriminating means 13. This discriminating means is to discriminate what cause a miss of auto-loading has arisen from. That is, when the film 8 is not inserted, or the leader of the film 8 is not sufficiently pulled out to engage with the drive sprocket 7 and the sprocket 9, the film 8 is not sent at all. Therefore, the sprocket 9 also does not rotate. From the detection signal of the detecting means 10, the discriminating means 13 discriminates the film unloading or the insufficient pullout of of the leader, causing the warning signal 11 to warn the auto-loading miss by light or sound. At the same time, the control means 1 stops the driving of the windup motor M2.

During the winding up of the first three frames, if the discriminating means 13 has discriminated that the winding up of each frame was not completed in a prescribed time, the discriminating means 13 causes the warning means 11 to warn the auto-loading miss, and at the same time the control means 1 stops the driving of the windup motor M2.

When the winding up of the three frames is normally completed, the control means 1 causes the drive circuit 2 to supply the windup motor M2 with current of reversed direction, and to rotate it in the other direction (for example, clockwise direction). Thereby, the changeover means 3 selects the high speed transmission system 12 of small speed reduction ratio so that the rotating force of the windup motor M2 is transmitted through the high speed transmission system 12 to only the spool 6. Since, at this time, the second low-speed transmission system 5 is cut off from the windup motor M2, the drive sprocket is not driven. If the film 8 is tightly convoluted on the spool 6 and if the winding up drive power is sufficient, the film 8 is wound up one frame at a relatively high speed by this spool drive.

If the film 8 is not tightly convoluted on the spool 6, the spool drive cannot send the film 8 at all, and the sprocket 9 also does not rotate. From the detection signal of the detecting means 10, therefore, the discriminating means 13 discriminates that the film 8 has not been sent to a critical standard length, or that the film 8 is loosely convoluted, causing the warning means 11 to warn the auto-loading miss. At the same time, the control means 1 stops the driving of the windup motor M2.

In another case where even though the film 8 is tightly convoluted on the spool 6, if the battery is almost used up, or the film 8 is heavy, when the spool drive is used, the film 8 will stop in the middle of a winding up course. In this case, however, since the film 8 is connected to the spool 6, that the film 8 does not move at all as in the loosely convoluted case is not true, and the film 8 is sent to some length, so that the sprocket 9 rotates to some degree. Hence, a considerably shorter prescribed sent length than the length of one frame of the film 8 is previously determined as the critical reference sent length. When the discriminating means 13 determines from the detection signal of the detecting means 10 that the film 8 has not been sent to more than the critical reference sent length, it then results that an auto-loading miss due to the loss of the winding up drive power is made detectable. Thereby, the control means 1 causes the drive circuit 2 to rotate the windup motor M2 again in one direction (for example, counterclockwise direction), and then the changeover means 3 to select the first and second low-speed transmission systems 4 and 5 of large speed reduction ratio. Because of this, the winding drive power increases, making it possible to wind up the remaining fraction of one frame of the film 8. If it is wound up, the warning of the auto-loading miss is not performed. If it is not wound up even by that, the warning means 11 warns the auto-loading miss, and the control means 1 stops the driving of the windup motor M2.

When to wind up the exposed frames of the film 8, the control means 1 operates the drive circuit 2 so that the windup motor M2 rotates in the other direction (clockwise direction). Thereby the changeover means 3 selects and maintains the high-speed transmission system 12 of small speed reduction ratio. The rotating force of the windup motor M2 is transmitted through the high-speed transmission system 12 to only the spool 6, by which the film 8 is wound up at the relatively high speed.

The changeover means 3, the first low-speed transmission system 4, the second low-speed transmission system 5 and the high-speed transmission system 12 constitute a windup transmission system K2. Yet, the low-speed transmission system 4, 5 and the high speed transmission system 12 may be constructed partly or as a whole with a common speed reduction gear train. In this case, such a form will be taken that the changeover means 3 is inserted midway through the transmission systems 4, 5 and 12. The windup motor M2 and the windup transmission system K2 constitute a windup drive system.

The detecting means 10 detects the winding-up states such as in-progress, just before the completion of winding up, and when the winding up is completed. Responsive to one of these detection signals, the control means 1 controls the deceleration and stop of the windup motor M2.

According to this embodiment, the last one blank frame of film for the auto-loading is made sent by the spool drive. As, at that time, a failure that the film 8 is not sent to the prescribed length of one frame is found, whether or not the sent length of the film 8 is longer than the critical reference sent length is further made discriminated, thereby it being made possible to discriminate the auto-loading miss between the loose convolution and the loss of the winding drive power. Thus, an advance in the technique of detecting the auto-loading miss when the spool drive is in use can be made possible to achieve.

In this or third embodiment, up to FIGS. 2 to 10 of the first two embodiments, the same features and flow chart may be applied, and therefore, their explanation is omitted.

Figure 15:
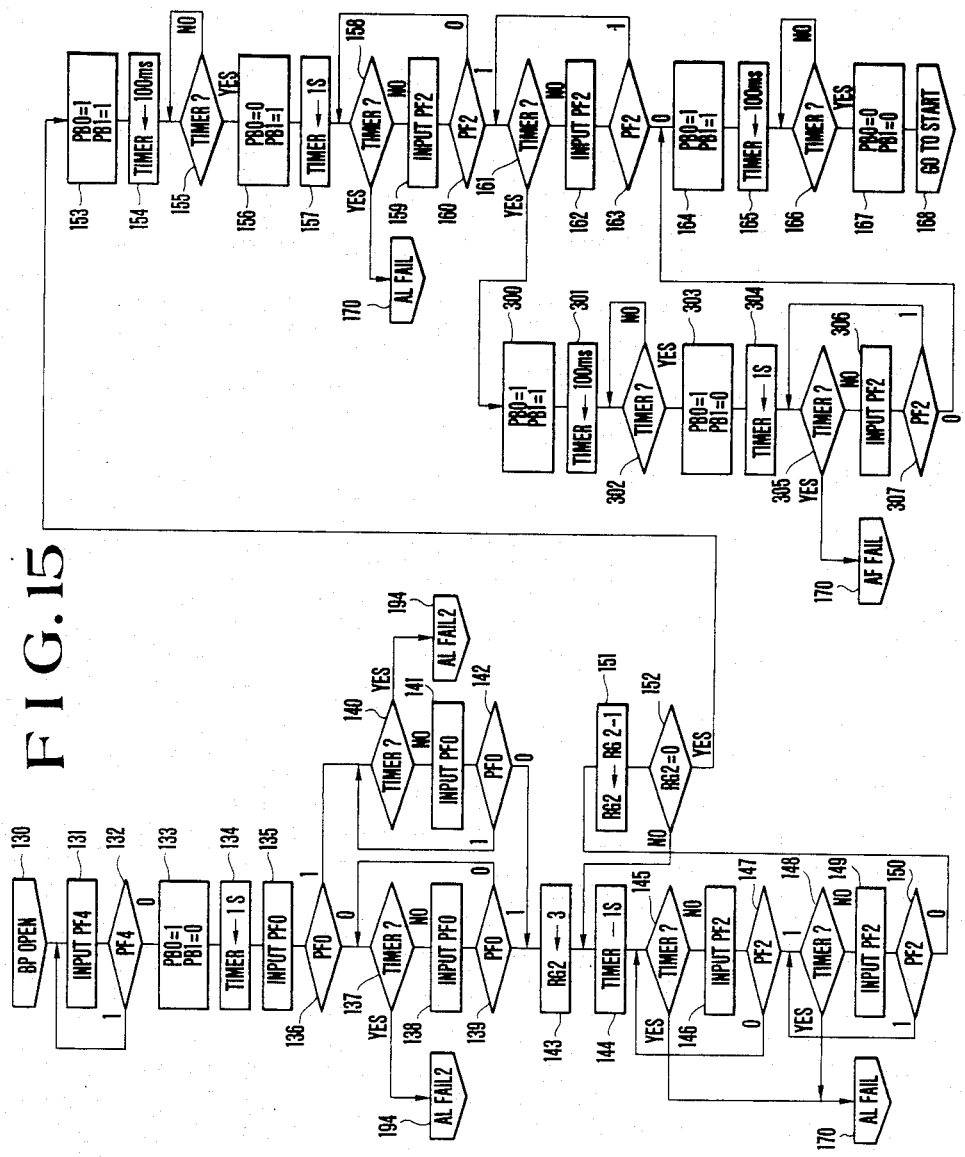
FIGS. 15 and 16 are a flow chart.
Figure 16:
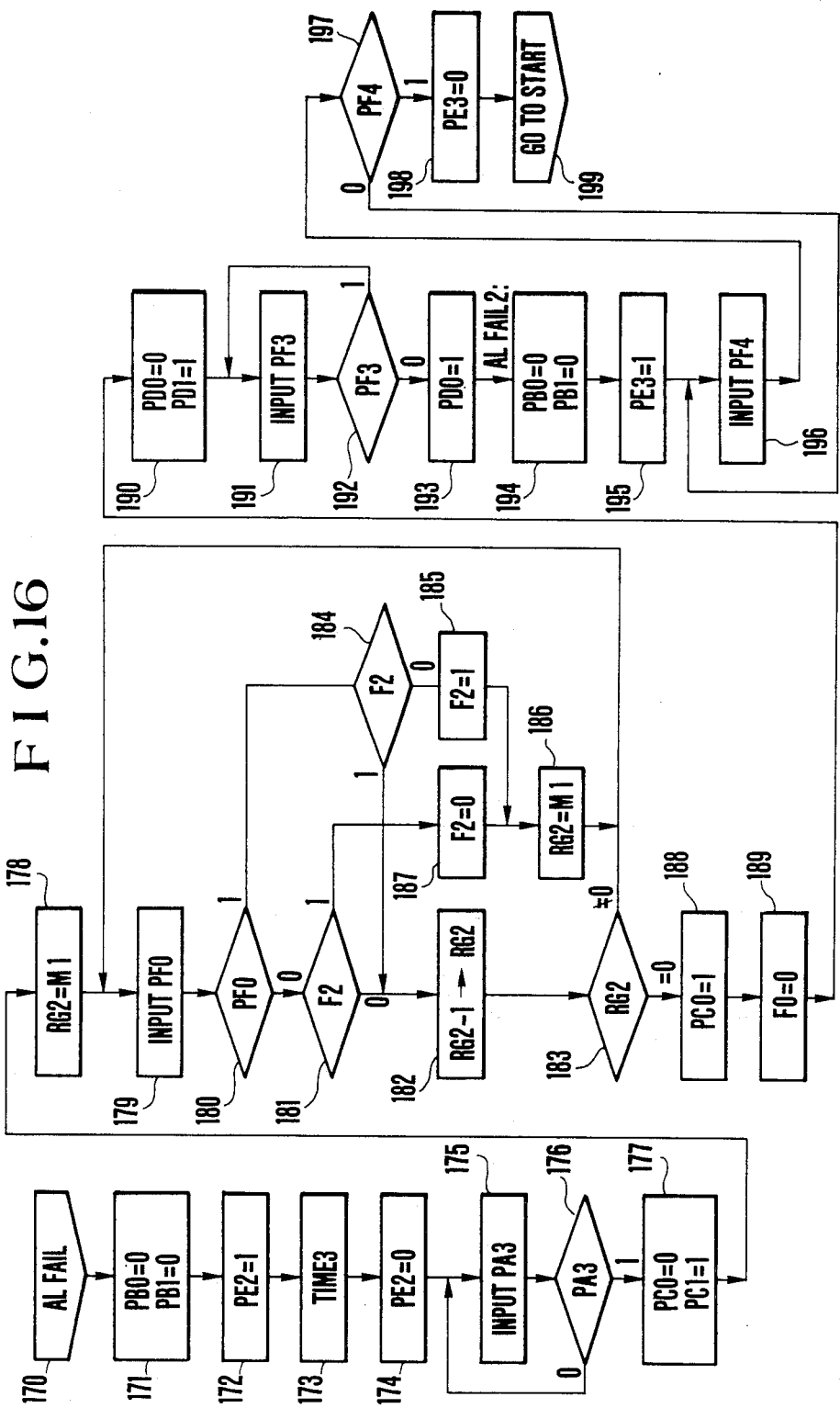

A film auto-loading treatment which is characteristic of this or third embodiment is described by reference to FIGS. 15 and 16.

Film Auto-Loading Treatment:

When the back cover of the camera is open, the flow branches from the step 3 to a step 130 (BP Open). This film auto-loading treatment is explained by reference to FIGS. 15 and 16.

Step 130: Start the film auto-loading treatment.

Steps 131-132: A routine for waiting till the back cover is closed. The photographer inserts a film cartridge into the cartridge chamber 310, and puts the leader of the film on the drive sprocket 29a and the sprocket 29b. Then when he closes the back cover, the PF4 input becomes 0, and a step 133 follows.

Step 133: By changing to PB0=1, PB1=0, the drive circuit DR2 is rendered operative, causing the windup motor in the counterclockwise direction. Thereby, the planetary lever 219a changes over to the low-speed gear train side of large speed reduction ratio, and the spool 211 and the drive sprocket 29a start to rotate.

The film is first sent on into the spool chamber by the rotation of the drive sprocket 29a. When the tip of the leader reaches the spool 211, it is snatched up by the spool 211. The film is then convoluted on the spool 211 by friction. Once the film convolutes on the spool 211, because the spool 211 has a faster winding up speed than the drive sprocket 29a, the film is pulled out by the spool 211.

Step 134: Steps 134-142 is a routine for detecting an auto-loading miss due to the unloading of the film or an insufficient pullout of the leader of film. In this step, a value of 1 sec. is set in a timer.

Step 135: Input a signal from the first film switch swFLM1.

Step 136: If the first film switch swFLM1 is on, advance to a step 137, or if off, to a step 140.

Steps 137-139: Examine whether or not the first film switch swFLM1 has changed from on to off in a period to the end of a counting of the set timer. If the film is normally sent, the sprocket 29b also rotates in following-up relation to the film, so that the first film switch swFLM1 repeats on-and-off. If, as the perforations of the film are not in engagement with the sprocket 29b, the film is not sent, the sprocket 29b does not rotate, leaving the first film switch swFLM1 not to change over. Therefore, when the film is correctly being sent, advance to a step 143. When not sent, the loop of the steps 137-139 repeats itself. Then when 1 sec. has passed as it is, branches to AL FAIL2. The AL FAIL2 means the auto-loading miss due to the unloading of the film or the insufficient pullout of the leader.

Steps 140-142: Examine whether or not the first film switch swFLM1 has changed from off to on during the time until the counting of the set timer ends. Similarly to the steps 137-139, if it has changed, advance to a step 143, or if not, branches to AL FAIL2.

Step 143: Set 3 in the internal register RG2.

Step 144: Set a time long enough to send one blank frame of film, for example, 1 sec. in the timer.

Steps 145-147: A routine for, as the third film switch swFLM3 is initially on, waiting for the change to off. If initially off, immediately advance to a step 148. Here, if it does not change within 1 sec., as this is taken as an auto-loading miss, branches to AL FAIL.

Steps 148-150: A routine for waiting for the change of the third film switch swFLM3 from on to off. If it changes, it implies that the film is sent in vain from the initial position to a position where the third film switch swFLM3 is on. Here, if it does not change within 1 sec. this is taken as an auto-loading miss, branches to AL FAIL.

Step 151: Since, in the steps 145-150, the film has been sent in one blank frame (actually from the initial position to the ON position of the third film switch swFLM3), subtract 1 from the internal register RG2.

Step 152: Test if the value of the internal register RG2 is 0. If not, return to the step 144. Therefore, the loop of the steps 144-152 is repeated until 0, or the first three frames of film are sent in vain.

Step 153: Brake the windup motor M2 by PB0=1, PB1=1.

Steps 154-155: Set 100 milliseconds to the timer and wait for this time.

Step 156: Change the rotation of the windup motor M2 to the clockwise direction by PB0=0, PB1=1. Thereby, the planetary lever 219a is moved to select the high speed gear train of small speed reduction ratio, so that the spool 211 only is driven. The drive sprocket 29a and the sprocket 29b are cut off from the windup motor M2, and become driven.

Step 157: Set a time long enough to send one blank frame of film, for example, 1 sec. to the timer.

Steps 158-160: A routine for waiting for the change of the third film switch swFLM3 from off to on. In a case when the film is loosely convoluted, or though the film is sent in the spool chamber by the drive sprocket 29a, it is not connected to the spool 211, the film does not move, so that the third film switch swFLM3 is maintained in ON state. Upon discrimination of it as an auto-loading miss, the flow is branched to AL FAIL. Conversely when the film is connected to the spool 211, the film moves and the third film switch swFLM3 is turned from on to off. So, advance to a step 161. For note, the contact width of the contact member S3 and the pulse substrate P2 in the third film switch swFLM3 is previously so adjusted that even when the film stop position at the time of the completion of winding up of the third blank frame is caused to slightly overrun by the inertia of the windup motor M2, the third film switch swFLM3 can be maintained ON without failure.

Steps 161-163: A routine for waiting for the change of the third film switch swFLM3 from on to off. This change implies that one blank frame is sent by being driven by the spool 211. Here, if it does not change within 1 sec. the cause of not winding up the film is discriminated as the heavy weight of the film, or the exhaustion of the battery. Then, branch to a step 300.

Step 164: Brake the windup motor M2 by PB0=1', PB1=1, and stop the film.

Step 165-166: Set 100 msec. to the timer, and wait for that time.

Step 167: Open both ends of the windup motor M2 by PB0=0, PB1=0.

Step 168: Since the auto-loading has succeeded, return to START.

Steps 300-302: In the case where, in the step 161, 1 sec. of the timer was expired, the cause of the auto-loading miss is discriminated as the loss of the winding drive power. Then, the flow has been branched to a step 300. Similarly to the steps 164-166, the windup motor M2 is braked for 100 msec.

Step 303: Change to PB0=1, PB1=0. Similarly to the step 133, the windup motor M2 is rotated in the counterclockwise direction, thereby the planetary lever 219a is turned to select the slow-speed gear train of large speed reduction ratio. The film which could not be wound up by the high speed gear train in the steps 161-163 is wound up again.

Steps 304-307: A routine for waiting for the change of the third film switch swFLM3 from off to on. This change implies that the film is sent one blank frame, and, therefore, is taken as the success of the auto-loading. Then return to the step 164. If the use of even the low-speed gear train has failed to wind up, as the third film switch swFLM3 never turns on in 1 sec., it is discriminated as the auto-loading miss. So, branch to AL FAIL.

Step 170: When branched to AL FAIL, the advance to this step has occurred.

Step 171: Open both ends of the windup motor M2 by PB0=0, PB132 0.

Steps 172-193: A similar treatment to the rewinding treatment of the steps 45-66. In case when the film is loosely convoluted, because two or more frames have been sent by the drive sprocket 29a, there is need to send back the film. Therefore, similarly to the above-described rewinding treatment, the trailing curtain is run down, then the film is rewound, and then the shutter is charged. After the charging of the shutter has been completed, advance to a step 194.

Step 194: When was branched to AL FAIL2, the advance to this step has occurred. By a change to PB0=0, PB1=0, the current supply to the windup motor M2 is cut off. Since, in the steps 137, 140, the film was not sent at all before branched to AL FAIL2, there is no need to do the rewinding.

Step 195: Change the output of the output port PE3 to 1. Thereby, the light-emitting diode L1 is supplied with current, emitting light to warn the auto-loading miss.

Steps 196-197: Input a signal from the back cover switch swBP, and wait till the back cover opens.

Step 198: When the back cover opens, stop the light emission of the light emitting diode L1.

Step 199: Return to START (step 1).

A fourth embodiment of the invention is next described by reference to FIG. 17. This embodiment is obtained by slightly modifying the above-described third embodiment, and concerns with a film auto-loading treatment for the film windup transmission system of FIG. 12 where the drive sprocket 29a and the sprocket 29b are mechanically linked to each other.

That is:

Step 200-203: Similarly to the steps 130 133, when the back cover is closed, the windup motor M2 is rotated in the counterclockwise direction, driving the spool 211, drive sprocket 29a and sprocket 29b. Because of this, even if the film is not sent, the first film switch swFLM1 changes over. Therefore, the steps 134-142 of FIG. 15 are unnecessary.

Step 204: Similar to the step 143.

Steps 205-206: Wait for the third film switch swFLM3 becoming off. Because the third film switch swFLM3 changes over without exception regardless of the film being not sent, such a timer as of FIG. 15 is unnecessary. Also, here, the auto-loading miss cannot be detected.

Steps 207-208: Wait for the change of the third film switch swFLM3 to on.

Steps 209 - 210: Similar to the steps 151 152. The loop of the step 205-210 is repeated until the internal register RG2 becomes 0, or three blank frames are sent.

Steps 211-213: Similar to the steps 153 155. Brake the windup motor M2 and wait for a time of 100 msec.

Steps 214-218: Similar to the steps 156-160. The windup motor M2 is rotated in the clockwise direction. Thereby, the spool drive takes place, while the drive sprocket 29a and the sprocket 29b become driven. Then, whether or not the sending of the last blank frame by the spool drive has been normally performed is examined. The maintenance of the third film switch swFLM3 in ON state is discriminated as the auto-loading miss due to the loose convolution of the film. Then, branch to a step 227.

Steps 219-221: Similarly to the steps 161-163, wait till the last one blank frame has been sent by the spool drive. If not wound up, it is discriminated as the auto-loading miss due to the loss of the winding drive power. So, branch to a step 233. If the blank sending is completed, then advance to step 222.

Steps 222-226: Similarly to the steps 164-168, brake the windup motor M2 and stop the film. After that, both ends of the windup motor M2 is opened. Then return to START (step 1).

Steps 233-240: Similarly to the steps 300-307, wind up again by the low-speed gear train. If wound up, advance to the step 222, if cannot, to a step 227.

Steps 227-232: Similarly to the steps 194-199, after cutting off the current supply to the windup motor M2, change the output of the output port PE3 to 1. Thereby the light-emitting diode L1 is supplied with current, emitting light to warn the auto-loading miss. When the back cover is opened, the light emission of the diode L1 is stopped.

As has been described above, according to the third and fourth embodiments of the invention, there are provided control means for causing both of the spool and the sprocket to be driven by the windup drive system in a period from the initial stage to before the end stage of a film auto-loading and for causing only said spool to be driven by said windup drive system when in the end stage of the film auto-loading, detecting means for detecting the sending of the film, and discriminating means for discriminating that the film is not sent to a prescribed length in the end stage of the film auto-loading, and at the same time discriminating whether or not the length to which the film is sent is longer than a critical reference sent length which is shorter than said prescribed length, whereby as the spool drive is used in the end stage of the auto-loading, when the film is not sent to the prescribed length, discrimination is made between the loose convolution based on the fact that the film is not sent up to the critical reference length, and the loss of the winding drive power based on the fact that the film has been sent to more than the critical reference length. Therefore, without adding an additional circuit, it is made possible to discriminate the cause of the auto-loading which is detected when the spool drive is in use between the loose convolution of the film and the poor drive power for the winding.

What is claimed is:

1. A film transport apparatus for a camera comprising:
   (a) a spool for taking up film by rotation;
   (b) a sprocket for sending the film to said spool by rotation;
   (c) first windup drive means for driving both of said spool and said sprocket;
   (d) second windup drive means for driving said spool;
   (e) control means for changing over the winding-up drive operation from said first windup drive means to said second windup drive means midway through a film auto-loading; and (f) detecting means for detecting that the film has not been moved to a prescribed length after the changeover of said windup drive operation by said control means.

2. A camera according to claim 1, wherein said first and said second windup drive means have a common rotation drive source.

3. A camera according to claim 2, wherein as said rotation drive source use is made of a reversible motor.

4. A camera according to claim 3, wherein said first windup drive means has a transmission system which is operated when said reversible motor rotates in one direction, and said second windup drive means has a transmission system which is operated when said reversible motor rotates in another direction opposite to said one direction.

5. A camera according to claim 4, wherein the changing over from said first windup drive means to said second windup drive means by said control means in response to change of the direction of rotation of said reversible motor is performed by a clutch operation of a planetary clutch having a planetary gear which revolves by rotation of said reversible motor.

6. A camera according to claim 1, wherein said second windup drive means is set to be able to wind up at a higher speed than said first windup drive means.

7. A camera according to claim 1, wherein said spool is set to be larger in the peripheral speed ratio than said sprocket.

8. A camera according to claim 7, wherein a transmission system to said sprocket in said first windup drive means is provided with a one-way clutch, so that after the film has been snatched up by said spool, said sprocket is rotated in following-up relation to the winding movement of the film.

9. A camera according to claim 1, wherein said detecting means detects a state that the film does not move in the winding direction to a prescribed length within a prescribed time.

10. A camera according to claim 9, wherein said detecting means detects the movement of the film by detecting the rotating state of a rotary disc operatively connected to said sprocket.

11. A camera according to claim 10, wherein said rotary disc has a pulse pattern formed thereon, whereby said detection is performed by putting a contact member in sliding contact with said pulse pattern.

12. A camera according to claim 9, wherein said detecting means detects the movement of the film by detecting the rotating state of a detector wheel which is driven to rotate only by the movement of the film.

13. A camera according to claim 12, wherein said detector wheel is operatively connected to a rotary disc having formed thereon a pulse pattern, whereby said detection is performed by putting a contact member in sliding contact with said pulse pattern.

14. A camera according to claim 1, further comprising warning means for performing a warning operation when the film has not moved for being wound up is detected by said detecting means.

15. A camera according to claim 1, further comprising means for stopping the operation of said second windup drive means when the film has not moved for being wound up is detected by said detecting means.

16. A camera according to claim 1, wherein said detecting means performs, after the changeover of said windup drive operation, a first detection of discriminating that the film does not move for being wound up a first prescribed length, and a second detection of discriminating whether or not the film has moved for being wound up a second prescribed length which is smaller than said first prescribed length.

17. A camera according to claim 16, further comprising means for stopping the operation of said second windup drive means when the film has not moved for being wound up said second prescribed length is discriminated by said second detection of said detecting means.

18. A camera according to claim 16, further comprising means for changing over the windup drive operation from said second windup drive means to said first windup drive means when the film has not moved for being wound up said first prescribed length is discriminated by said first detection of said detecting means, and when the fact that the film has moved for being wound up said second prescribed length is discriminated by said second detection.

19. A film transport apparatus for a camera comprising:

(a) a spool for taking up film by rotation;
(b) a sprocket for sending the film to said spool by rotation;
(c) first windup drive means for driving both of said spool and said sprocket;
(d) second windup drive means for driving said spool;
(e) control means for changing over the winding-up drive operation from said first windup drive means to said second windup drive means midway through a film auto-loading; and
(f) detecting means for detecting that the film has not been moved to a prescribed length after the changeover of said windup drive operation by said control means.
(g) rewind drive means for driving the film to be rewound to a film cartridge; and
(h) rewind control means for stopping the windup drive operation by said second windup drive means and starting a rewind drive by said rewind drive means, when the film has not moved for being wound up a prescribed length is detected by said detecting means.

20. A film transport apparatus for a camera comprising:

(a) a spool for taking up film by rotation;
(b) a sprocket for sending the film to said spool by rotation;
(c) first windup drive means for driving both of said spool and said sprocket;
(d) second windup drive means for driving said spool;
(e) control means for changing over the winding-up drive operation from said first windup drive means to said second windup drive means, said changeover by said control means being effected after the film has been wound up by a prescribed length; and
(f) detecting means for detecting that the film has not been moved to a prescribed length after the changeover of said windup drive operation by said control means.

* * * * *